United States Patent
Taguchi et al.

(10) Patent No.: US 7,903,160 B2
(45) Date of Patent: Mar. 8, 2011

(54) DATA TRANSFER CIRCUIT, SOLID-STATE IMAGING DEVICE AND CAMERA

(75) Inventors: Hiroyuki Taguchi, Gunma (JP); Hiroyuki Iwaki, Kanagawa (JP); Ken Koseki, Kanagawa (JP); Akiko Fujiwara, Saitama (JP); Hiroyuki Terakago, Kanagawa (JP); Kenichi Matsunaga, Kanagawa (JP); Yukio Fujita, Nagasaki (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 12/082,941

(22) Filed: Apr. 15, 2008

(65) Prior Publication Data

US 2008/0303931 A1    Dec. 11, 2008

(30) Foreign Application Priority Data

May 10, 2007 (JP) ................ P2007-125741
Sep. 28, 2007 (JP) ................ P2007-256856

(51) Int. Cl.
H04N 3/14 (2006.01)
H04N 5/335 (2006.01)
H04N 3/16 (2006.01)

(52) U.S. Cl. .......................... 348/308; 348/374
(58) Field of Classification Search .............. 348/294, 348/308, 316, 321, 374
See application file for complete search history.

(56) References Cited

FOREIGN PATENT DOCUMENTS

JP    2005 32331    11/2005
JP    2005-323331    11/2005

OTHER PUBLICATIONS

Yang, et al., "An Integrated 800×600 CMOS Image System", ISSCC Digest of Technical Papers, Feb. 17, 1999, pp. 304-305.

W. Yang 等 (W. Yang et al., "An Integrated 800×600 CMOS Image System," ISSCC Digest of Techincal Paper, pp. 304-305, Feb. 1999).

*Primary Examiner* — Gevell Selby
(74) *Attorney, Agent, or Firm* — Robert J. Depke; Rockey, Depke & Lyons, LLC

(57) ABSTRACT

Disclosed herein is a data transfer circuit including, a plurality of data transfer lines, a plurality of data outputting sections, a plurality of data holding sections, a data-acquiring-clock supplying section a clock supplying section, and a column scan section.

22 Claims, 22 Drawing Sheets

DATA TRANSFER CIRCUIT, SOLID-STATE IMAGING DEVICE AND CAMERA

CROSS REFERENCES TO RELATED APPLICATIONS

The present invention contains subject matter related to Japanese Patent Applications JP 2007-125741 and JP 2007-256856 filed in the Japan Patent Office on May 10, 2007 and Sep. 28, 2007, the entire contents of which being incorporated herein by reference.

BACKGROUND OF THE INVENTION

1. Field of the Invention

The present invention relates to a data transfer circuit, a solid-state imaging device represented by a CMOS image sensor and a camera system.

2. Description of the Related Art

In recent years, as a solid-state imaging device used as an image sensor to replace a CCD, a CMOS image sensor has been attracting attention.

This is because special processes are required in fabricating a CCD pixel and, in addition, a plurality of power-supply voltages are needed in order to operate the CCD pixel. On top of that, in the case of the CCD, it is necessary to combine a plurality or peripheral chips and operate the chips. The CMOS image sensor is thus used as a sensor for solving a variety of problems each raised in a system based on CCD pixels as a problem making the system complicated.

The CMOS image sensor can be fabricated by adoption of a manufacturing process identical with the process for fabricating an ordinary CMOS integrated circuit. In addition, the CMOS image sensor can be driven by making use of a single power supply. On top of that, an analog circuit and a logic circuit, which are created by adopting the CMOS process, can be mixed with each other on the same chip as the CMOS image sensor. Thus, the CMOS image sensor offers a plurality of big merits including a decreased number of peripheral ICs.

The data outputting circuit of a CCD is usually a 1-channel data outputting circuit employing an FD (floating diffusion) amplifier having an FD layer. In the case of a CMOS image sensor, on the other hand, each pixel generally employs an FD amplifier. A row of a pixel array is selected and pieces of information are read out at the same time from pixels on the selected row in the row direction to generate an output of the CMOS image sensor. Thus, the output of the CMOS image sensor is generally an output parallel to the pixel rows of the pixel array.

This is because, with an FD amplifier embedded in a pixel, it is difficult to provide a sufficient driving power. It is thus necessary to reduce the data rate and parallel processing is regarded as advantageous processing.

There have been proposed a great variety of data outputting circuits of the CMOS image sensor having an output parallel to the pixel rows of the pixel array as described above. In accordance with one of most advanced types of the data outputting circuit, each column is provided with an analog-digital conversion device for outputting a pixel signal as a digital signal. In the following description, the analog-digital conversion device is referred to as an ADC (analog digital converter).

A CMOS image sensor employing an on-a-row ADC for every pixel column is disclosed in documents such as W. Yang et al., "An Integrated 800×600 CMOS Image System," ISSCC Digest of Technical Papers, pp. 304-305, February 1999 and Japanese Patent Laid-open No. 2005-323331.

FIG. 1 is a block diagram showing a typical configuration of a solid-state imaging device 1 (also referred to as a CMOS image sensor) employing an on-a-row ADC for each pixel column.

As shown in the figure, the solid-state imaging device 1 employs a pixel-array section 2 serving as an imaging unit, a row scan circuit 3, a column scan circuit 4, a timing control circuit 5, an ADC group 6, a digital-analog converter 7, a counter 8 and an data outputting circuit 9 including a plurality of S/A (sense amplifier) circuits. In the following description, the digital-analog converter 7 is referred to as merely as a DAC.

The pixel-array section 2 is a matrix of unit pixels 2-1 each including a photo diode and an in-pixel amplifier. The timing control circuit 5 is a circuit for generating internal clock signals whereas the row scan circuit 3 is a circuit for generating row addresses and for controlling a row scan operation. The column scan circuit 4 is a circuit for generating column addresses and for controlling a column scan operation. In the solid-state imaging device 1, the row scan circuit 3, the column scan circuit 4 and the timing control circuit 5 are employed as control circuits for reading out a signal from the pixel-array section 2.

The ADC group 6 having a function to convert an analog signal into digital data of n bits forms and including an ADC block 6-3 for a plurality of column lines V0, V1 and so on. To put it in detail, the ADC group 6 employs the same plurality of comparators 6-1 each connected to one of the pixel column lines V0, V1 and so on and the same plurality of memory units 6-2 each associated with one of the comparators 6-1. Each of the comparators 6-1 compares a ramp-waveform reference voltage RAMP generated by the DAC 7 as a signal having a staircase waveform with an analog signal generated by a unit pixel 2-1 selected by one of row lines H0, H1 and so on and connected to the comparator 6-1 by one of the pixel column lines V0, V1 and so on. Each of the memory units 6-2 is used for storing the contents of the counter 8 which carries out a counting operation to measure the length of the time of the comparison carried out by the comparator 6-1. Each particular one of the comparators 6-1 and a memory unit 6-2 connected to the particular comparator 6-1 form the aforementioned on-a-row ADC is provided.

The output of the memory unit 6-2 is connected to a horizontal data transfer line 6-4 having a width of 2n bits, that is, 2n horizontal data transfer lines. The horizontal data transfer line 6-4 is also connected to an output circuit through the data outputting circuit 9 including 2n sense amplifiers for the 2n bits respectively.

Operations carried out by the solid-state imaging device 1 (also referred to as a CMOS image sensor) are explained by referring to timing charts shown in FIG. 2 and the block diagram of FIG. 1 as follows.

After a first operation to read out data from unit pixels 2-1 on a row Hx and transfer the data to the pixel column lines V0, V1 and so on becomes stable, the DAC 7 supplies a ramp-waveform reference voltage RAMP as a signal having a staircase waveform to the comparators 6-1. The comparators 6-1 each compare the ramp-waveform reference voltage RAMP with a voltage appearing on the pixel column line Vx.

While the DAC 7 is supplying the ramp-waveform reference voltage RAMP as a signal having a staircase waveform to the comparator 6-1, the counter 8 carries out a first counting operation for the first read operation. When the ramp-waveform reference voltage RAMP becomes equal to the voltage appearing on the pixel column line Vx, the output of the comparator 6-1 is inverted in order to store the contents of the counter 8 in the memory unit 6-2 as data representing the length of the time of the comparison. In the first read operation, a reset component ΔV of the unit pixel 2-1 is read out. The reset component ΔV includes a noise varying by unit pixel as an offset. In general, however, variations in reset component ΔV are small. In addition, a reset level is uniform for all the unit pixels 2-1. Thus, the output of any column line Vx is known approximately.

Thus, by adjusting the ramp-waveform reference voltage RAMP in the first read operation to read out the reset component ΔV, the time of the comparison carried out by the comparator 6-1 can be made short. In this example, the comparison is carried out as counting data of 7 bits representing up to 128 clock pulses.

The second read operation is carried out in the same way as the first one described above. In the second read operation, however, a reset component ΔV and a signal component representing an incident-light quantity are read out from the unit pixel 2-1.

To put it in detail, after the second operation to read out data from unit pixels 2-1 on a row Hx and transfer the data to the pixel column lines V0, V1 and so on becomes stable, the DAC 7 supplies the ramp-waveform reference voltage RAMP as a signal having a staircase waveform to the comparators 6-1. The comparators 6-1 each compare the ramp-waveform reference voltage RAMP with the voltage arbitrary appearing on the pixel column line Vx.

While the DAC 7 is supplying the ramp-waveform reference voltage RAMP as a signal having a staircase waveform, the counter 8 carries out a counting operation for the second read operation. When the RAMP becomes equal to the voltage appearing on the pixel column line Vx, the output of the comparator 6-1 is inverted in order to store the contents of the counter 8 in the memory unit 6-2. The length of the time of the comparison carried out by the comparator 6-1 in the second read operation is stored at a location different from the location for storing the length of the time of the comparison carried out by the comparator 6-1 in the first read operation.

At the end of the AD conversion processes described above, the column scan circuit 4 transfers an n-bit digital signal representing the length of the time of the comparison carried out by the comparator 6-1 in the first read operation and an n-bit digital signal representing the length of the time of the comparison carried out by the comparator 6-1 in the second read operation from the memory unit 6-2 to the data outputting circuit 9 by way of the horizontal data transfer line 6-4 having a width of 2n bits. In the data outputting circuit 9, a sequential subtraction circuit subtracts the n-bit digital signal representing the length of the time of the comparison carried out in the first read operation from the n-bit digital signal representing the length of the time of the comparison carried out in the second read operation and outputs the difference to an external circuit as a result of the subtraction. Then, the same operations are carried out sequentially for each row in order to generate a 2-dimensional image.

SUMMARY OF THE INVENTION

In the solid-state imaging device 1 (also referred to as a CMOS image sensor) explained above, an on-a-row read method is adopted. Thus, the speed of a row-direction scan operation (that is, the vertical scan operation) becomes very low. On the other hand, data of all unit pixels on the same row must be read out in a 1-H (horizontal scan) period of the column-line direction scan operation, the column-line direction scan operation has to be carried out at an extremely high speed.

By the way, in the solid-state imaging device 1 (also referred to as a CMOS image sensor) explained above, the horizontal data transfer line is very long. The horizontal data transfer line has a typical length of 7 mm. Thus, due to factors such as a parasitic capacitance and parasitic resistance of the horizontal data transfer line, a difference in time of detection between a data transfer line segment in close proximity to a sense circuit and a data transfer line segment far away from the data outputting circuit including a sense amplifier is vary widely.

In general, in a process to serially read out pieces of counting data from counter-data latching memory units 6-2 each provided for one of pixel columns laid out over a wide area and transfer the data to the data outputting circuit 9 through the horizontal data transfer line 6-4, pieces of data received from all the memory units 6-2 are read out at the same time for a data latching timing of the data outputting circuit 9 including sense amplifier circuits.

In this case, the data outputting circuit 9 needs to latch data coming from a memory unit 6-2 in close proximity to the data outputting circuit 9 and data coming from a memory unit 6-2 far away from the data outputting circuit 9 always with the same timing.

If the memory units 6-2 are separated away from each other in an extremely wide area, however, a difference in data transfer line delay time between the memory-units 6-2 is too big, making it difficult to latch pieces of data from the sources with the same timing. The higher the transfer speed (that is, the higher the clock frequency), the bigger the effect of a time delay of imaging data transferred along the horizontal data transfer line 6-4.

In recent years, the development of an image sensor not only employing a large number of unit pixels and operating at a high speed, but also having a big size has been making much progress. In consequence, the effect of a time delay of imaging data transferred along the horizontal data transfer line obstructs an effort to raise the column (horizontal) scan speed of the image sensor.

Inventors of the present invention have innovated a data transfer circuit capable of reducing the effect of a time delay of imaging data transferred along a data transfer line on a data outputting circuit, capable of driving the data outputting circuit to read out data with a high degree of accuracy and a high degree of precision as well as capable of increasing a scan speed, innovated a solid-state imaging device employing the data transfer circuit as well as innovated a camera system employing the solid-state imaging device.

According to an embodiment of the present invention, there is provided a data transfer circuit including:

a plurality of data transfer lines each used for transferring data;

a plurality of data outputting sections each used for detecting the data transferred by one of the data transfer lines and acquiring the detected data synchronously with a data acquiring clock signal;

a plurality of data holding sections laid out to form a parallel circuit, each used for holding data according to an input level and each used for transferring the held data to a data transfer line included in the data transfer lines as a data transfer line associated with the held data in response to a select signal;

a data-acquiring-clock supplying section configured to supply the data acquiring clock signal to each of the data outputting sections;

a clock supplying section configured to generate at least a master clock signal; and a column scan section configured to generate the select signal synchronously with a driving-clock signal and outputting the select signal to each of the data holding sections, wherein:

the data transfer lines are laid out in a direction, in which the data holding sections are laid out to form the parallel circuit, and connected to their respective data outputting sections also laid out in the same direction;

the column scan section employs:

a plurality of select-signal generation sections laid out in the direction, in which the data holding sections are laid out to form the parallel circuit, each used for generating the select signal synchronously with the received driving-clock signal and each used for outputting the select signal to a data holding section included in the data holding sections as a data holding section corresponding to the select signal; and a driving-clock propagation line for propagating the master clock signal and supplying the master clock signal to each of the select-signal generation sections as the driving-clock signal; and the data-acquiring-clock supplying section supplies the master clock signal or a clock signal taking the master clock signal as a reference signal to each of the data outputting sections as the data acquiring clock signal.

According to another embodiment of the present invention, there is provided a solid-state imaging device including:

an imaging section including a plurality of pixels laid out to form a matrix and each used for carrying out an opto-electrical conversion process;

a plurality of data transfer lines each used for transferring data;

a plurality of data outputting sections each used for detecting the data transferred by one of the data transfer lines and acquiring the detected data synchronously with a data acquiring clock signal;

a plurality of data holding sections laid out to form a parallel circuit, each used for holding data according to an input level and each used for transferring the held data to a data transfer line included in the data transfer lines as a data transfer line associated with the held data in response to a select signal;

a data-acquiring-clock supplying section configured to supply the data acquiring clock signal to each of the data outputting sections;

a clock supplying section configured to generate at least a master clock signal; and a column scan section configured to generate the select signal synchronously with a driving-clock signal and outputting the select signal to each of the data holding sections, wherein:

the data transfer lines are laid out in a direction in which the data holding sections are laid out to form the parallel circuit and connected to their respective data outputting sections also laid out in the same direction;

the column scan section employs:

a plurality of select-signal generation sections laid out in the direction in which the data holding sections are laid out to form the parallel circuit, each used for generating the select signal synchronously with the received driving-clock signal and each used for outputting the select signal to a data holding section included in the data holding sections as a data holding section corresponding to the select signal; and a driving-clock propagation line for propagating the master clock signal and supplying the master clock signal to each of the select-signal generation sections as the driving-clock signal; and the data-acquiring-clock supplying section supplies the master clock signal or a clock signal taking the master clock signal as a reference signal to each of the data outputting sections as the data acquiring clock signal.

According to yet another embodiment of the present invention, there is provided a camera system having a solid-state imaging device, an optical system for creating an image on the solid-state imaging device and a signal processing circuit for processing an image signal output by the solid-state imaging device wherein:

the solid-state imaging device includes:

an imaging section including a plurality of pixels laid out to form a matrix and each used for carrying out an opto-electrical conversion process;

a plurality of data transfer lines each used for transferring data;

a plurality of data outputting sections each used for detecting the data transferred by one of the data transfer lines and acquiring the detected data synchronously with a data acquiring clock signal;

a plurality of data holding sections laid out to form a parallel circuit, each used for holding data according to an input level and each used for transferring the held data to a data transfer line included in the data transfer lines as a data transfer line associated with the held data in response to a select signal;

a data-acquiring-clock supplying section configured to supply the data acquiring clock signal to each of the data outputting sections;

a clock supplying section configured to generate at least a master clock signal; and a column scan section configured to generate the select signal synchronously with a driving-clock signal and outputting the select signal to each of the data holding sections, the data transfer lines are laid out in a direction in which the data holding sections are laid out to form the parallel circuit and connected to their respective data outputting sections also laid out in the same direction;

the column scan section employs:

a plurality of select-signal generation sections laid out in the direction in which the data holding sections are laid out to form the parallel circuit, each used for generating the select signal synchronously with the received driving-clock signal and each used for outputting the select signal to a data holding section included in the data holding sections as a data holding section corresponding to the select signal; and a driving-clock propagation line for propagating the master clock signal and supplying the master clock signal to each of the select-signal generation sections as the driving-clock signal; and the data-acquiring-clock supplying section supplies the master clock signal or a clock signal taking the master clock signal as a reference signal to each of the data outputting sections as the data acquiring clock signal.

In accordance with the present invention, it is possible to reduce the effect of a time delay of imaging data transferred along the horizontal data transfer line to a data outputting section. Thus, the data outputting sections are each capable of acquiring imaging data with a high degree of accuracy and a high degree of precision.

BRIEF DESCRIPTION OF THE DRAWINGS

FIG. 9A shows the timing chart of the waveform of a master clock signal;

FIG. 9B shows the timing chart of the waveform of a farthest driving-clock signal;

FIG. 9C shows the timing chart of the waveform of a closest driving-clock signal;

FIG. 9D shows the timing chart of the waveform of a closest data acquiring clock signal;

FIG. 9E shows the timing chart of the waveform of a farthest data acquiring clock signal;

FIG. 9F shows the timing chart of the waveform of a farthest select signal (or a farthest select pulse);

FIG. 9G shows the timing chart of the waveform of a closest select signal (or a closest select pulse);

FIG. 9H shows the timing chart of imaging data transferred to a data transfer line provided at the uppermost layer;

FIG. 9I shows the timing chart of imaging data transferred from the data transfer line to a sense amplifier circuit at the uppermost layer;

FIG. 9J shows the timing chart of imaging data transferred from a data transfer line to a sense amplifier circuit at the lowermost layer;

FIG. 9K shows the timing chart of imaging data output by a data synchronization circuit provided at the uppermost layer;

FIG. 9L shows the timing chart of imaging data output by a data synchronization circuit provided at the lowermost layer;

FIG. 18A shows the timing chart of the waveform of the master clock signal;

FIG. 18B shows the timing chart of the waveform of a farthest driving-clock signal;

FIG. 18C shows the timing chart of the waveform of a closest driving-clock signal;

FIG. 18D shows the timing chart of the waveform of a data acquiring clock signal;

FIG. 18E shows the time chart of imaging data output from a farthest counter latch;

FIG. 18F shows the time chart of imaging data output from a closest counter latch;

FIG. 18G shows the time chart of imaging data output by a data synchronization circuit;

FIG. 18H shows the time chart of imaging data output by a final data outputting circuit;

DETAILED DESCRIPTION OF THE PREFERRED EMBODIMENT

An embodiment of the present invention is explained by referring to diagrams as follows.

Figure 1:
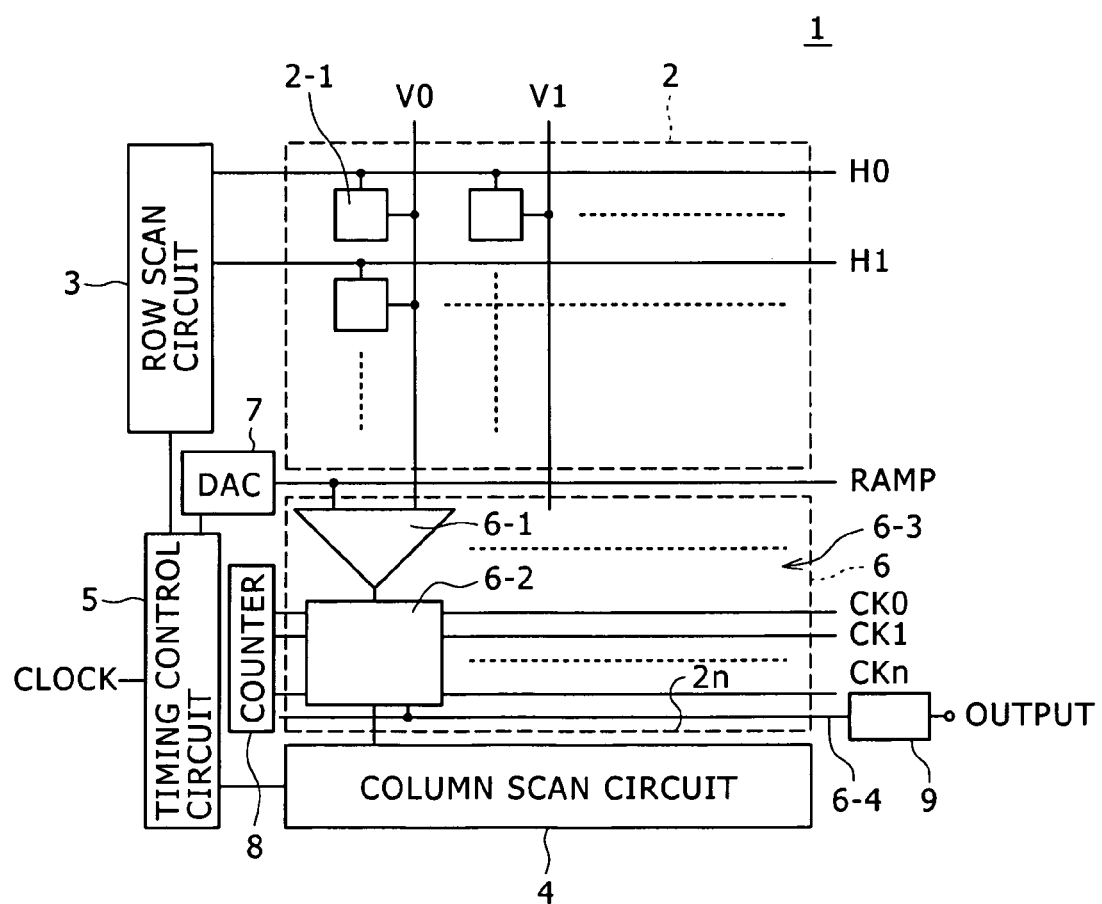
FIG. 1 is a block diagram showing a typical configuration of a solid-state imaging device (also referred to as a CMOS image sensor) employing an on-a-row ADC for each column.
Figure 2:
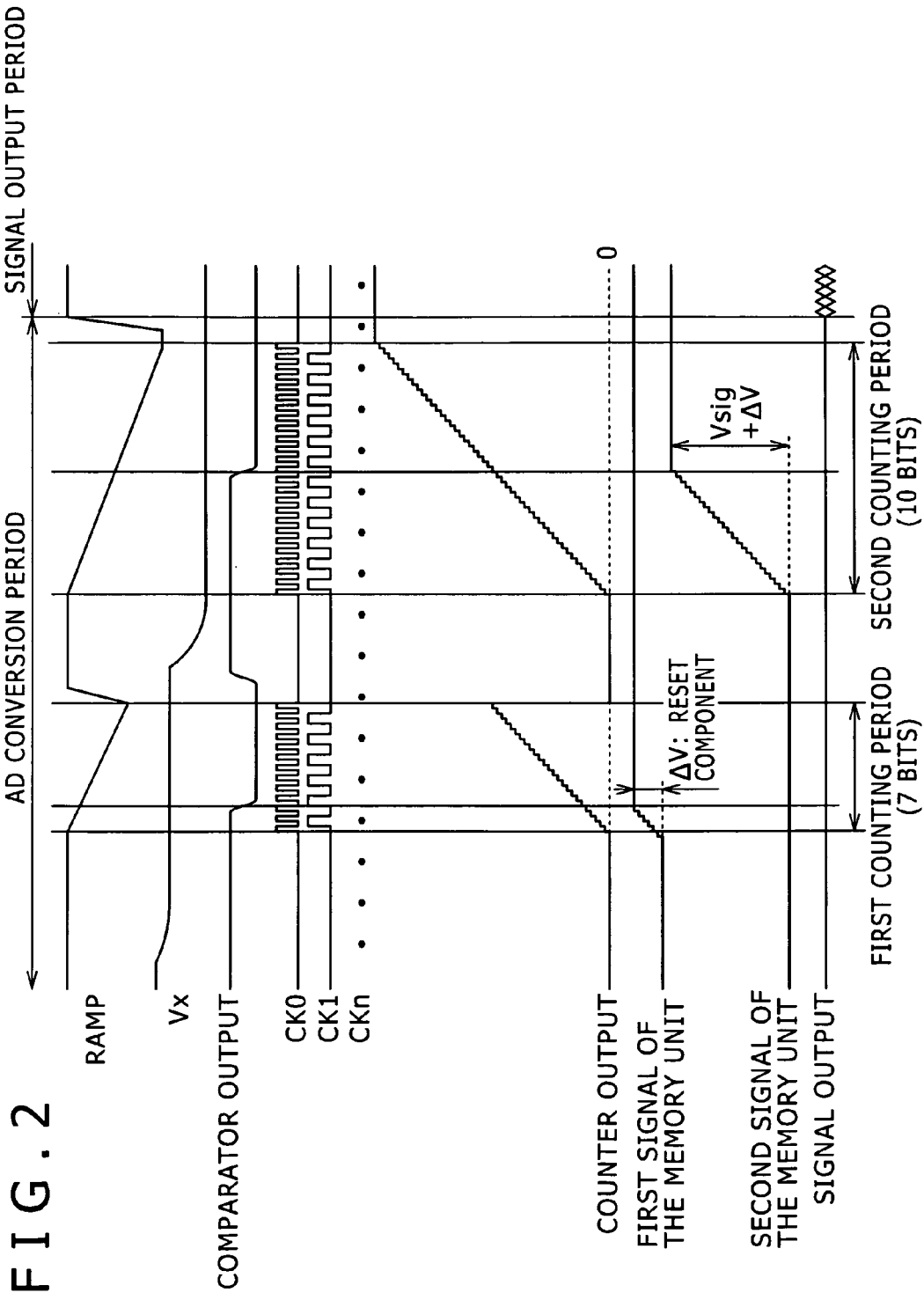
FIG. 2 shows explanatory timing charts to be referred to in description of operations carried out by the solid-state imaging device shown in FIG. 1.
Figure 3:
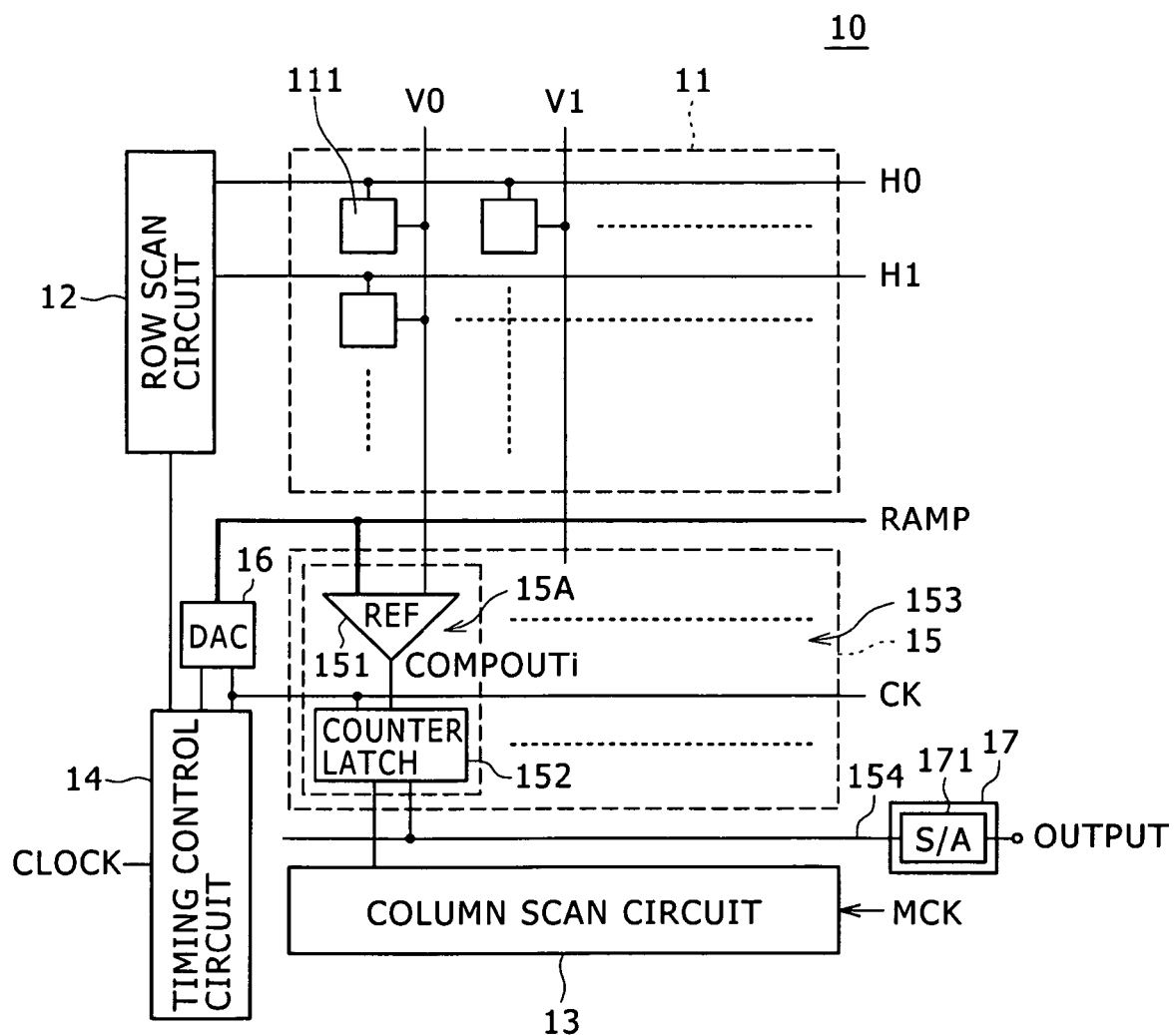
FIG. 3 is a block diagram showing a typical configuration of an on-a-row-ADC-type solid-state imaging device (also referred to as a CMOS image sensor) including a data transfer circuit according to an embodiment of the present invention.
Figure 4:
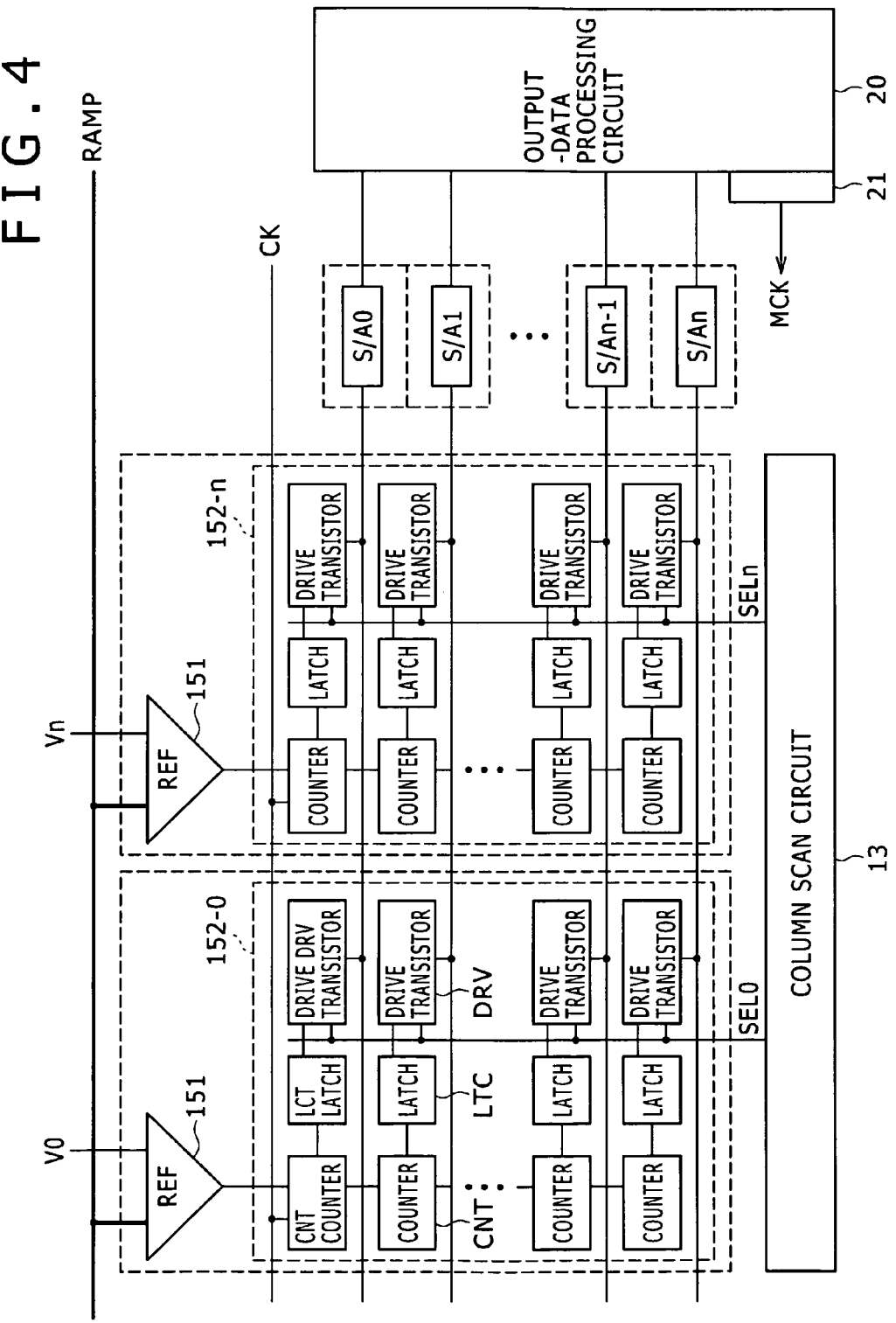
FIG. 4 is a block diagram showing a more concrete typical configuration of the data transfer system including the data transfer circuit employed in the on-a-row-ADC-type solid-state imaging device shown in FIG. 3.

FIG. 3 is a block diagram showing a typical configuration of an on-a-row-ADC-type solid-state imaging device (also referred to as a CMOS image sensor) including a data transfer circuit according to an embodiment of the present invention. FIG. 4 is a block diagram showing a more concrete typical configuration of the data transfer system including the data transfer circuit employed in the on-a-row-ADC-type solid-state imaging device shown in FIG. 3.

As shown in FIG. 3, the solid-state imaging device 10 employs a pixel array section 11 functioning as an imaging section, a row scan circuit 12, a column scan circuit 13, a timing control circuit 14, an ADC group 15, a DAC 16 and a plurality of data outputting circuits (each also referred to as a data detection circuit) 17 each employing a sense amplifier (S/A) circuit 171.

The pixel array section 11 employs unit pixels 111 laid out to form a pixel matrix consisting of M rows and N columns. Each of the unit pixels 111 includes a photodiode and an in-pixel amplifier.

The timing control circuit 14 is a circuit for generating internal clock signals whereas the row scan circuit 12 is a circuit for generating row addresses and for controlling a row scan operation. The column scan circuit 13 is a circuit for generating column addresses and for controlling a column scan operation. In the solid-state imaging device 10, the row scan circuit 12, the column scan circuit 13 and the timing control circuit 14 are employed as control circuits for reading out a signal from the pixel array section 11.

The ADC group 15 having a function to convert an analog signal into digital data forms an on-a-row ADC block 153 for a plurality of column lines V0, V1 and so on. To put it in detail, the ADC group 15 employs the same plurality of comparators 151 each connected to one of the pixel column lines V0, V1 and so on as well as the same plurality of asynchronous up/down counters (each referred to hereafter as a counter latch) 152 each connected to one of the comparators 151. In the typical configuration shown in FIG. 3, the ADC group 15 employs (n+1) comparators 151, i.e., comparators 151-0 to 151-n shown in FIG. 4. Each particular one of the comparators 151 and a counter latch 152 connected to the particular comparator 151 together form an on-a-row ADC 15A for a pixel column associated with the particular comparator 151 and the counter latch 152 connected to the particular comparator 151. Each of the comparators 151 compares a ramp-waveform reference voltage RAMP generated by the DAC 16 as a signal having a staircase waveform with an analog signal generated by a particular unit pixel 111 selected by one of row lines H0, H1 and so on and connected to the comparator 151 by one of the pixel column lines V0, V1 and so on. While receiving the output of the comparator 151, each of the counter latches 152 carries out a count-up or count-down operation counting the number of clock pulses generated by the timing control circuit 14 in order to measure the length of the time of the comparison carried out by the comparator 151, that is, in order to measure the magnitude of the analog signal generated by the particular unit pixel 111 on the pixel column of the pixel matrix.

The output of the counter latch 152 is connected to a data transfer line 154. The data transfer line 154 is also connected to the input terminal of a sense amplifier circuit 17 employed in the data outputting circuit 17.

The counter latch 152 executes a function of a data holding circuit as follows. At an initial time, the counter latch 152 is set in a count-down state for carrying out a count-down operation in order to measure the magnitude of a reset voltage appearing on the unit pixel 111. As the output COMPOUTi of the comparator 151 is inverted, the counter latch 152 stops the count-down operation and holds the resulting value.

When the counter latch 152 starts the count-down operation, the counter latch 152 contains an initial count value of typically 0. The initial count value is any value of the gradation of the AD conversion carried out by the ADC 15A. The count value latched at the end of the count-down operation thus represents a reset count period proportional to the aforementioned reset component ΔV of the unit pixel 111.

Thereafter, the counter latch 152 is set in a count-up state for carrying out a count-up operation in order to measure data representing the quantity of light incident to the unit pixel 111. As the output COMPOUTi of the comparator 151 is inverted, the counter latch 152 stops the count-up operation and latches the count value representing the period of the comparison process carried out by the comparator 151, that is, representing the difference between the reset component ΔV of the unit pixel 111 and the imaging data created in the unit pixel 111.

The count value latched finally in the counter latch 152 is supplied to the sense amplifier circuit 171 through the data transfer line 154 as a digital signal when the scan operation carried out by the column scan circuit 13 hits the counter latch 152.

Typically, the column scan circuit 13 is activated by being supplied with a start pulse STR and driven thereafter by a master clock pulse MCK. The column scan circuit 13 supplies a select signal to the counter latch 152 through a select line SEL to assert data latched in the counter latch 152 on the data transfer line 154. The column scan circuit 13 supplies a select signal to the counter latch 152 through the select line SEL synchronously with a driving clock pulse CLK derived from the master clock pulse MCK, that is, a driving clock pulse CLK taking the master clock pulse MCK as a reference.

The ADC 15A employed in the solid-state imaging device 10 shown in FIG. 3 is explained by referring to FIG. 4 which is a block diagram showing a more concrete typical configuration of a data transfer system.

As shown in FIG. 4, the data transfer system includes counter latches 152-0 to 152-n employ as many series circuits as data bits. The series circuits each provided for a data bit each include a counter CNT, a latch LTC and a drive transistor circuit DRV Tr which are connected to each other in series. The number of data bits is typically 10 or 12. The number of aforementioned counter latches 152-0 to 152-n is n+1, the data transfer system shown In FIG. 4 employs (n+1) on-a-row ADCs 15A.

In an operation to transfer data, the column scan circuit 13 sequentially supplies select signals to the counter latches 152-0 to 152-n through select lines SEL0 to SELn respectively. The sequential operation to sequentially supply the select signals to the counter latches 152-0 to 152-n is begun by a start pulse at a selected start position and continued by sequentially selecting a pixel column indicated by a bit shifted through a shift register or the like employed in the column scan circuit 13. Information of 0 or 1 generated by each drive transistor circuit DRV Tr of a selected pixel column is read by the data transfer line 154. The information appearing on the data transfer line 154 is detected by the sense amplifier circuit 171 employed in the data outputting circuit 17 connected to the data transfer line 154. The data outputting circuit 17 then outputs the information detected by the data outputting circuit 17 to the output-data processing circuit 20.

Figure 5:
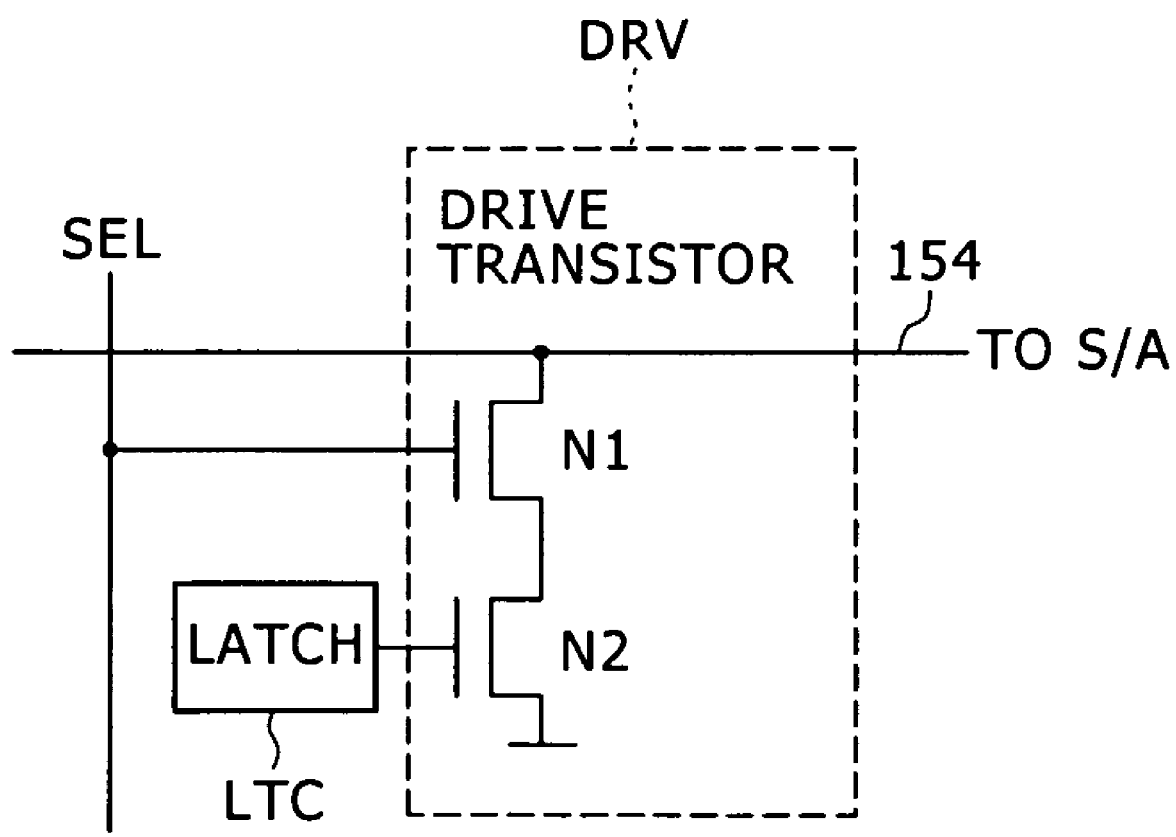
FIG. 5 is a diagram showing a concrete example of a drive transistor circuit DRV Tr employed in a counter latch according to the embodiment.

FIG. 5 is a diagram showing a concrete example of a drive transistor circuit DRV Tr employed in a counter latch 152 according to the embodiment. As shown in FIG. 5, the drive transistor circuit DRV Tr typically has an NMOS (n-channel MOS) select transistor NT1 and an NMOS data transistor NT2, which are connected to each other in series between the data transfer line 154 and a line having a predetermined electric potential such as the electric potential of the ground. The gate of the NMOS select transistor NT1 is connected to one of the select lines SEL0 to SELn driven by the column scan circuit 13. On the other hand, the gate of the NMOS data transistor NT2 is connected to the latch LTC.

One of the select lines SEL0 to SELn connected to the column scan circuit 13 drives the gate of the NMOS select transistor NT1 to an on state connecting the data transfer line 154 to the NMOS data transistor NT2 which enters an on or off state in accordance with data latched in the latch LTC driving the gate of the NMOS data transistor NT2. The information generated by the NMOS data transistor NT2 is read on the data transfer line 154 and detected by the sense amplifier circuit 171, which serves as a data detection circuit.

If data latched in the latch LTC is 1, a current path is created, causing a current to flow. If data latched in the latch LTC is 0, on the other hand, no current path is created, causing no current to flow.

In the data transfer system according to the embodiment, the operation to read data latched in the counter latch 152 on the data transfer line 154 and the operation to detect the data read on the data transfer line 154 are carried out synchronously with a driving-clock signal CLK based on a master clock signal MCK generated by the master-clock supplying circuit 21 provided at the data input stage of the output-data processing circuit 20.

The embodiment is designed into a configuration capable of compensating for variations of the time delay of data propagated from the counter latch 152 to the sense amplifier circuit 171 through the data transfer line 154 serving as a data bus by proper variations of the time delay of the driving clock pulse CLK generated in the column scan circuit 13 supplying a select signal to the counter latch 152

The following description explains a plurality of examples used for exemplifying the data transfer system capable of compensating for variations of the time delay of data propagated from the counter latch 152 to the sense amplifier circuit 171 through the data transfer line 154 by proper variations of the time delay of the driving clock pulse CLK generated in the column scan circuit 13 supplying a select signal to the counter latch 152.

<First Typical Configuration of the Data Transfer System>

Figure 6:
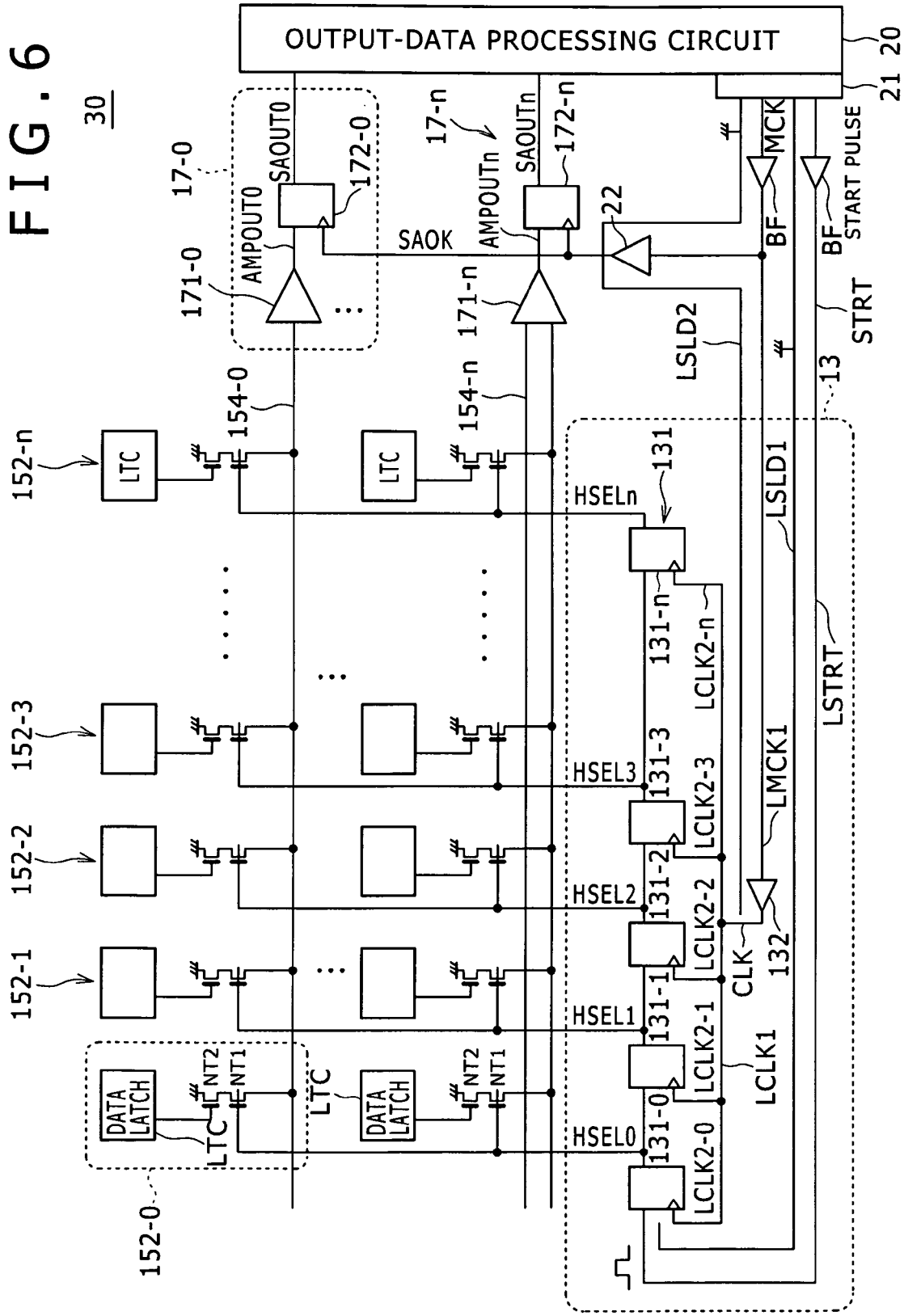
FIG. 6 is a diagram showing a first typical configuration of the data transfer system according to the embodiment.

FIG. 6 is a diagram showing a first typical configuration of a data transfer system 30 according to the embodiment.

The column scan circuit 13 employed in the data transfer system 30 according to the embodiment is basically a shift register 131 for sequentially shifting a start pulse STRT synchronously with the driving-clock signal CLK based on the master clock signal MCK. The sequentially shifted start pulse STRT sequentially generates select signals HSEL0 to HSELn for driving the select lines SEL0 to SELn respectively. Typically, the shift register 131 employs flips flops 131-0 to 131-n each serving as a select-signal generation section configured to latching the start pulse STRT to serve as one of the select signals HSEL0 to HSELn.

In the column scan circuit 13 employed in the data transfer system 30 shown in FIG. 6, the master-clock supplying circuit 21 supplies the master clock signal MCK to the column scan circuit 13 through a master-clock propagation line LMCK1 connected to the input of a buffer 132 provided at a location in close proximity to the middle of the shift register 131 consisting of the select-signal generation sections 131-0 to 131-n so that the driving-clock signal CLK generated by the buffer 132 is propagated uniformly to the select-signal generation sections 131-0 to 131-n which form a parallel circuit seen from the buffer 132.

In addition, the buffer 132 receives the master clock signal MCK and supplies the driving-clock signal CLK to the select-signal generation sections 131-0 to 131-n through a driving-clock propagation line LCLK1 and driving-clock distribution lines LCLK2-0 to LCLK2-n respectively. The driving-clock propagation line LCLK1 is stretched in a direction in which the select-signal generation sections 131-0 to 131-n are laid out.

The driving-clock distribution lines LCLK2-0 to LCLK2-n start from junction points on the driving-clock propagation line LCLK1 and end at locations in close proximity to the clock input terminals of their respective select-signal generation sections 131-0 to 131-n. The driving-clock distribution lines LCLK2-0 to LCLK2-n are laid out in the direction of select lines SEL0 to SELn conveying the select signals HSEL0 to HSELn respectively, that is, a direction perpendicular to the layout direction of the select-signal generation sections 131-0 to 131-n or a direction perpendicular to the stretching direction of the driving-clock propagation line LCLK1.

In addition, the master-clock generation section 21 also supplies the start pulse STRT to the column scan circuit 13 through a start-pulse propagation line LSTRT and connected to the data input terminal of the select-signal generation section 131-0. On top of that, the master-clock generation section 21 also supplies the master clock signal MCK to data outputting circuits 17-0 to 17-n by way of a phase adjustment section 22 which passes on the master clock signal MCK as a data acquiring clock signal SACK to the data outputting circuits 17-0 to 17-n through a SACK line. The data acquiring clock signal SACK line is stretched from a location in close proximity to the data input terminal of the data outputting circuit 17-0 farthest from the phase adjustment section 22 to a location in close proximity to the data input terminal of the data outputting circuit 17-n closest to the phase adjustment section 22. The data input terminal of a data outputting circuit 17 is the input terminal of the sense amplifier circuit 171 employed in the data outputting circuit 17. The data acquiring clock signal SACK line is stretched in the same direction as the select lines SEL0 to SELn conveying select signals HSEL0 to HSELn respectively, that is, a direction perpendicular to the stretching direction of the driving-clock propagation line LCLK1.

The data outputting circuits 17-0 to 17-n are connected to data transfer lines 154-0 to 154-n respectively. The data outputting circuits 17-0 to 17-n employ sense amplifier circuits 171-0 to 171-n respectively and data synchronization circuits 172-0 to 172-n respectively. The sense amplifier circuit 171 detects imaging data on the data transfer line 154. That is to say, the sense amplifier circuit 171 receives and amplifies the imaging data. The data synchronization circuit 172 acquires the imaging data, which is output by the sense amplifier circuit 171, synchronously with the data acquiring clock signal SACK supplied by the data acquiring clock signal SACK line and outputs the data to an output-data processing circuit 20. Typically, the data synchronization circuit 172 is a flip flop driven by the data acquiring clock signal SACK.

In the typical configuration of the data transfer system 30 shown in FIG. 6, the master-clock supplying circuit 21 supplies the master clock signal MCK to the data outputting circuits 17-0 to 17-n by way of the phase adjustment section 22 which passes on the master clock signal MCK as a data acquiring clock signal SACK to the data synchronization circuits 172-0 to 172-n employed in the data outputting circuits 17-0 to 17-n respectively through the data acquiring clock signal SACK line as described above.

The phase adjustment section 22 adjusts the phase of the master clock signal MCK in a time delay adjustment process so that the imaging data output by the sense amplifier circuit 171 can be acquired by the data synchronization circuit 172 with a high degree of precision. The phase adjustment section 22 adjusts the phase of the master clock signal MCK by considering propagation delays generated in the column scan circuit 13 as propagation delays of the master clock signal MCK propagating through the column scan circuit 13. The phase adjustment section 22 also considers time delays generated in operations to transfer imaging data from the counter latches 152-0 to 152-n to the data outputting circuits 17-0 to 17-n respectively by way of the data transfer lines 154-0 to 154-n respectively as driven by the select signals HSEL0 to HSELn appearing on the select lines SEL0 to SELn respectively in accordance with the driving-clock signal CLK.

In addition, the typical configuration of the data transfer system 30 shown in FIG. 6 also typically employs a shield line LSLD1 provided between the start-pulse propagation line LSTRT for conveying a start pulse STRT generated by the master-clock generation section 21 and the master-clock propagation line LMCK1, between the start-pulse propagation line LSTRT and the driving-clock propagation line LCLK1 as well as between the start-pulse propagation line LSTRT and the driving-clock distribution line LCLK2-0.

Kept at a predetermined fixed electric potential such as the electric potential of the ground, the shield line LSLD1 is used for getting rid of undesirable effects such as the effect of interferences between the start-pulse propagation line LSTRT and the master-clock propagation line LMCK1, between the start-pulse propagation line LSTRT and the driving-clock propagation line LCLK1 as well as between the start-pulse propagation line LSTRT and the driving-clock distribution line LCLK2-0.

By the same token, the typical configuration of the data transfer system 30 shown in FIG. 6 also typically employs a shield line LSLD2 provided between the master-clock propagation line LMCK1 and the driving-clock propagation line LCLK1 parallel to the master-clock propagation line LMCK1 and stretched over the output side of the phase adjustment section 22 for adjusting the phase of the master clock signal MCK. Kept at a predetermined fixed electric potential such as the electric potential of the ground, the shield line LSLD2 is used for getting rid of undesirable effects such as the effect of interferences among the master-clock propagation line LMCK1, the driving-clock propagation line LCLK1 and another clock propagation line.

Figure 7:
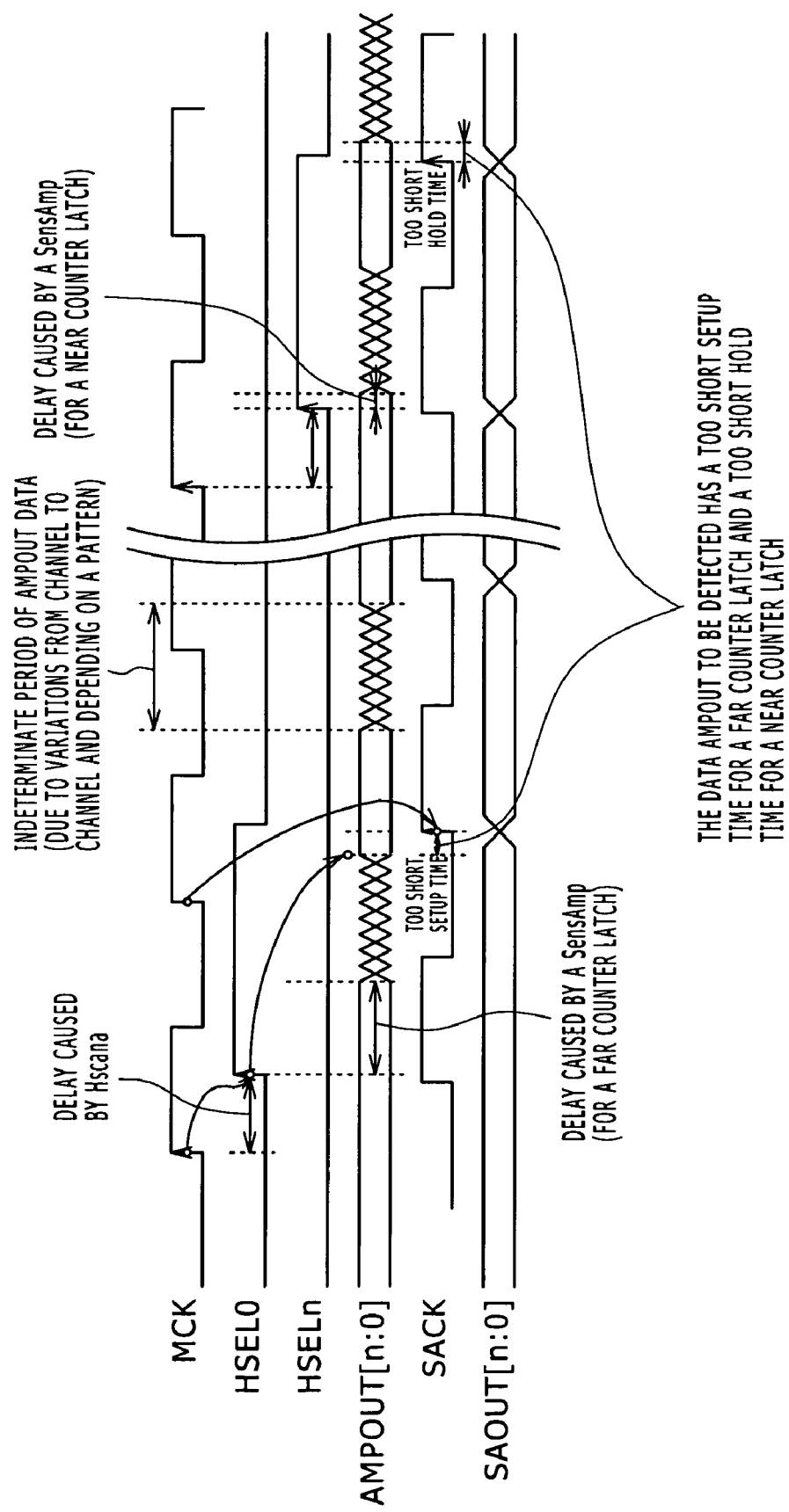
FIG. 7 shows timing charts of the data transfer system shown in FIG. 6.

FIG. 7 shows timing charts of the data transfer system 30 shown in FIG. 6. In the data transfer system 30 shown in FIG. 6, as shown by the timing charts of FIG. 7, first of all, the shift register 131 for carrying out a column (horizontal) scan operations operates synchronously with the driving-clock signal CLK based on the master clock signal MCK generated by the master-clock generation section 21, outputting the select signals HSEL0, HSEL1 ... and HSELn through respectively the select lines SEL0, SELL ... and SELn as signals for sequentially selecting the counter latches 152 (each serving as a data storage section) after some time delays.

When counter latches 152 on a pixel column are selected, pieces of imaging data stored in the counter latches 152 are read on the data transfer lines 154-0 to 154-n and amplified by respectively the sense amplifiers 171-0 to 171-n employed in the data outputs circuits 17-0 to 17-n respectively. The sense amplifiers 171-0 to 171-n output data AMPOUT [n:0] as a result of the amplification.

The data AMPOUT [n:0] read out by the sense amplifiers 171-0 to 171-n from the data transfer lines 154-0 to 154-n respectively is finally output to respectively the data synchronization circuits 172-0 to 172-n synchronously with the data acquiring clock signal SACK asserted on the data acquiring clock signal SACK line as a signal resulting from a phase adjustment process (that is, a phase delaying process) carried out by the phase adjustment section 22 on the master clock signal MCK. Then, the data synchronization circuits 172-0 to 172-n pass on the data AMPOUT [n:0] to the output-data processing circuit 20.

In the data transfer system 30 having the configuration shown in FIG. 6, the phase adjustment section 22 basically sets the quantity of the phase adjustment at a proper value so as to compensate for time-delay variations by data transfer line (or data bus) 154 (that is, variations of the time delay of imaging data propagated from the counter latch 152 to the sense amplifier circuit 171 through the data transfer line 154) by delaying the master clock pulse MCK supplied to the data synchronization circuit 172 by way of the phase adjustment section 22 by the proper value. Thus, data-transfer delay variations among the data transfer lines 154-0 to 154-n can be absorbed. As a result, the imaging data can be detected and output with a high degree of accuracy.

By the way, there is fear that, in some cases, it is difficult for the data transfer system 30 to detect and output imaging data appearing on the data transfer lines 154-0 to 154-n with a high degree of accuracy due to a reason described as follows.

In particular, if the phase adjustment section 22 only is used for carrying out the phase adjustment process, the capability of performing the process is limited by the clock frequency and variations in data transfer time delay. It is feared that the operations carried out by the data synchronization circuits 172-0 to 172-n to acquire data AMPOUT [n:0] from the sense amplifiers 171-0 to 171-n synchronously with the data acquiring clock signal SACK asserted on the data acquiring clock signal SACK line as a signal resulting from a phase adjustment process (that is, a phase delaying process) carried out by the phase adjustment section 22 on the master clock signal MCK may not be successful in some cases due to an increased speed of the operation carried out by the pixel column (horizontal) scan circuit 13.

The cause of the unsuccessful operations is not just the high speed. Another possible cause is the fact that the transferred imaging data includes extremely big skew components.

Skew components included in the transferred data can be classified into the following four large categories.

The first category includes skew components attributed to time-delay variations caused by the so-called fabrication-process variations as variations in transfer time delay among the sense amplifier circuits 171-0 to 171-n employed in the data outputting circuits 17-0 to 17-n respectively and/or the MOS transistors NT1 and NT2 employed in the counter latches 152-0 to 152-n.

The second category includes skew components caused by transfer time delay variations attributed to the pattern of imaging data transferred through the data transfer lines (that is, the horizontal signal lines) 154-0 to 154-n. The pattern of the imaging data can be a dynamic pattern such as 1 . 0 . 1 . 0 . 1 . 0 . and so on or an isolated pattern such as 0 . 0 . 0 . 1 . 0 . 0 . and so on.

The third category includes skew components caused by noises such as substrate noises and clock noises as follows. A big noise will result in an abnormal event such as inversion of the imaging data transferred through the data transfer lines 154-0 to 154-n. Even if the noise is not big, however, such noises overlap each other in imaging data being transferred to give rise to the occurrence of a phenomenon like chattering in the vicinity of the threshold of the output amplifier circuit 171. Such a phenomenon lengthens the time it takes to confirmedly determine the magnitude of the imaging data.

The fourth category includes skew components caused by transfer time delay variations attributed to differences in physical distance to the sense amplifier circuit 171 employed in the data outputting circuit 17 between the data latches 152 outputting the imaging data transferred through the data transfer lines 154. The differences in physical distance are caused by whether the counter latch 152 is provided at a location far away from the sense amplifier circuit 171 or a location in close proximity to the sense amplifier circuit 171. In the typical configuration of the data transfer system 30 shown in the figure, the counter latch 152-0 at the left end is farthest from the sense amplifier circuit 171 whereas the counter latch 152-n at the right end is closest to the sense amplifier circuit 171.

Thus, the data AMPOUT [n:0] generated by the sense amplifiers 171-0 to 171-n has a very long indeterminate period. In addition, as shown in FIG. 7, the sum of a time delay caused by the sense amplifier circuit 171-0 associated with the selected counter latch 152-0 farthest from the sense amplifier circuit 171 and a time delay of the select signal HSEL0 for selecting the counter latch 152-0 is still different from the sum of a time delay caused by the sense amplifier circuit 171-n associated with the selected counter latch 152-n closest to the sense amplifier circuit 171 and a time delay of the select signal HSELn for selecting the counter latch 152-n even though the select signals HSEL0 and HSELn are deliberately generated at different timings to eliminate variations in data transfer line time delay among the data transfer lines 154-0 to 154-n. Thus, it is difficult to set a proper data acquiring timing by merely making use of a single data acquiring clock signal SACK in order to eliminate the difference in delay-time sum. In addition, the sum of the time delay caused by the sense amplifier circuit 171 and the time delay of the select signal HSEL used for selecting the counter latch 152 associated with the sense amplifier circuit 171 may make it very hard to set a proper setup or hold time for the data AMPOUT [n:0]. In some cases, there is fear that, if the worst comes to the worst, it becomes impossible to set a data acquiring timing by making uses of the single data acquiring clock signal SACK in order to obtain stable complete data AMPOUT [n:0].

The skew components caused by differences in transfer distance naturally exist in the structure of an image sensor. In addition, in recent years, efforts to raise the size of an image sensor keeping up with the increasing number of pixels and the rising processing speed but also the widening market of single-lens reflex cameras have also been making much progress. Thus, a countermeasure against skew components caused by differences in transfer distance plays an important role in increasing the speed of the pixel column (horizontal) scan operation.

Based on what has been described above, the following description explains a typical configuration of the data transfer system capable of adequately keeping up with an increasing number of pixels and a rising processing speed in CMOS image sensors.

<Second Typical Configuration of the Data Transfer System>

Figure 8:
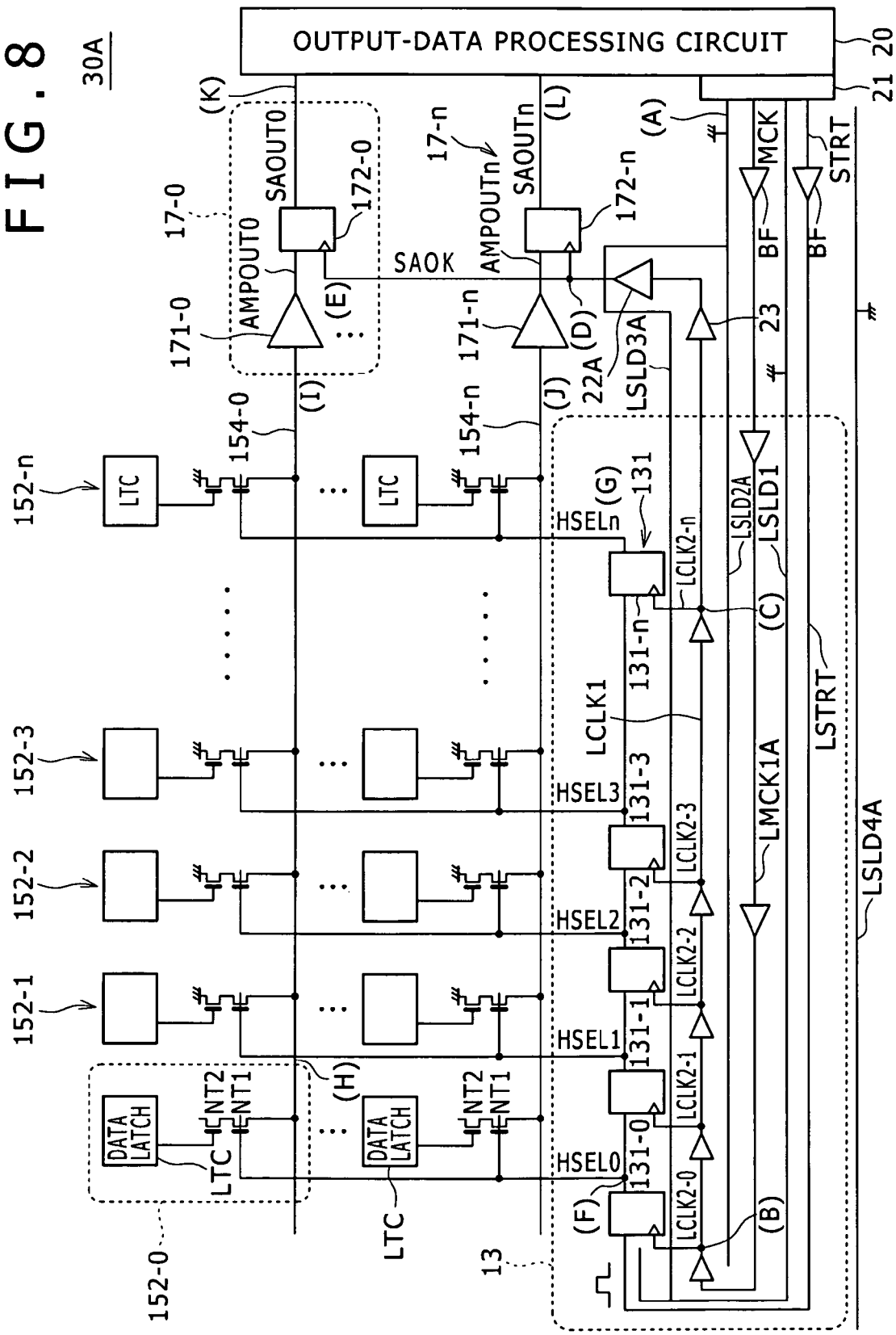
FIG. 8 is a diagram showing a second typical configuration of the data transfer system according to the embodiment.

FIG. 8 is a diagram showing a second typical configuration of a data transfer system 30A according to the embodiment.

The data transfer system 30A shown in FIG. 8 is different from the data transfer system 30 shown in FIG. 6 in that, in the case of the data transfer system 30 shown in FIG. 6, the master-clock propagation line LMCK1 is extended to a position at about the middle of the horizontal layout of the select-signal generation sections 131-0 to 131-n but, in the case of the data transfer system 30A shown in FIG. 8, the master-clock propagation line LMCKLA is extended to a position beyond the location of the select-signal generation section 131-0 which is a select-signal generation section 131 farthest from the data input terminals of the data outputting circuits 17-0 to 17-n, that is, the input terminals of the sense amplifier circuits 171-0 to 171-n employed in the data outputting circuits 17-0 to 17-n respectively. In addition, in the case of the data transfer system 30A shown in FIG. 8, the master-clock propagation line LMCK1A is extended to the position beyond the location of the select-signal generation section 131-0 through a buffer 132 and connected to the driving-clock propagation line LCLK1 at the position beyond the location of the select-signal generation section 131-0. The driving-clock propagation line LCLK1 is stretched in a direction perpendicular to the pixel column lines (that is, perpendicular to the directions of the driving-clock distribution lines LCLK2).

As described above, in the case of the data transfer system 30A shown in FIG. 8, the driving-clock propagation line LCLK1 is so created in the column scan circuit 13 that the master-clock propagation line LMCK1A is folded at the position beyond the location of the select-signal generation section 131-0 which is a select-signal generation section 131 farthest from the data input terminals of the data outputting circuits 17-0 to 17-n, that is, the input terminals of the sense amplifier circuits 171-0 to 171-n employed in the data outputting circuits 17-0 to 17-n respectively.

Then, driving-clock distribution lines LCLK2-0 to LCLK2-n start from junction points on the driving-clock propagation line LCLK1 and end at locations in close proximity to the clock input terminals of their respective select-signal generation sections 131-0 to 131-n. The driving-clock distribution lines LCLK2-0 to LCLK2-n are laid out in the column line direction, that is, a direction perpendicular to the direction of the driving-clock propagation line LCLK1.

Thus, in the data transfer system 30A shown in FIG. 8, select signals HSEL0 to HSELn are supplied sequentially to the array of the select-signal generation sections 131-0 to 131-n in an order starting with the select signal HSEL0 for the select-signal generation section 131-0 farthest from the data input terminals of the data outputting circuits 17-0 to 17-n (that is, the input terminals of the sense amplifier circuits 171-0 to 171-n employed in the data outputting circuits 17-0 to 17-n respectively) and ending with the select signal HSELn for the select-signal generation section 131-n closest to the data input terminals of the data outputting circuits 17-0 to 17-n.

In other words, in the data transfer system 30A shown in FIG. 8, the direction of the propagation of the driving-clock signal CLK along the array of the select-signal generation sections 131-0 to 131-n is the same as the direction of the transfer of imaging data from the counter latches 152-0 to 152-n to the sense amplifier circuits 171-0 to 171-n respectively. That is to say, the data transfer system 30A is configured in such a way that variations of the time delay caused by a time constant of the capacitance and resistance of the driving-clock propagation line LCLK1 passed through by the driving-clock signal CLK propagating to the select-signal generation sections 131-0 to 131-n in the column scan circuit 13 is compensated for by variations of the time delay caused by a time constant of the capacitance and resistance of each of the data transfer lines (that is, the data bus) 154-0 to 154-n stretched from the counter latches 152-0 to 152-n respectively to the sense amplifier circuits 171-0 to 171-n respectively.

In addition, it is nice to design a configuration that provides a fixed sum of the time delay caused by a segment of the driving-clock propagation line LCLK1 passed through by the driving-clock signal CLK propagating to any particular one of the select-signal generation sections 131 in the column scan circuit 13 and the time delay caused by a segment of a data transfer line 154 as a time delay of propagation of imaging data from the counter latch 152 on the same pixel column as the particular select-signal generation section 131 to the corresponding sense amplifier circuit 171 without regard to the location of the selected pixel column. In such a configuration, a sufficient timing margin for driving the data outputting circuit 17 can be read so that high-speed driving and read operations can be carried out.

In addition, in the data transfer system 30A shown in FIG. 8, the driving-clock propagation line LCLK1 is further extended in the row direction (that is, the direction of the layout of the select-signal generation sections 131-0 to 131-n) from its junction with the driving-clock distribution line LCLK2-n (that is, the driving-clock distribution line LCLK2 at the rightmost end of the layout of the select-signal generation sections 131-0 to 131-n) toward the master-clock generation section 21 and connected to a repeater 23. After passing through the repeater 23, the driving-clock propagation line LCLK1 is extended in the column-line direction (that is, a direction perpendicular to the direction of the layout of the select-signal generation sections 131-0 to 131-n) and connected to the phase adjustment (delaying) section 22A for generating a data acquiring clock signal SACK.

In addition, the start-pulse propagation line LSTRT conveying the start pulse STRT is extended in a direction parallel to the master-clock propagation line LMCK1A in the column scan circuit 13 from the select-signal generation section 131-n closest to the data input terminals of the data outputting circuits 17-0 to 17-n (that is, the input terminals of the sense amplifier circuits 171-0 to 171-n employed in the data outputting circuits 17-0 to 17-n respectively) to the select-signal generation section 131-0 farthest from the data input terminals of the data outputting circuits 17-0 to 17-n. Then, the start-pulse propagation line LSTRT is further extended in the column line direction (that is, a direction perpendicular to the direction of the driving-clock signal LCLK1) and connected to the data input terminal of the select-signal generation section 131-0.

In addition, the data transfer system 30A shown in FIG. 8 also typically employs a shield line LSLD1A provided between the start-pulse propagation line LSTRT for conveying a start pulse STRT generated by the master-clock generation section 21 and the master-clock propagation line LMCK1A as well as between the start-pulse propagation line LSTRT and the driving-clock distribution line LCLK2-0. Kept at a predetermined fixed electric potential such as the electric potential of the ground, the shield line LSLD1A is used for getting rid of undesirable effects such as the effect of interferences between the start-pulse propagation line LSTRT and the master-clock propagation line LMCK1A as well as between the start-pulse propagation line LSTRT and the driving-clock distribution line LCLK2-0.

By the same token, the data transfer system 30A shown in FIG. 8 also typically employs a shield line LSLD2A between the master-clock propagation line LMCK1A and the driving-clock propagation line LCLK1 parallel to the master-clock propagation line LMCK1A. The shield line LSLD2A is stretched over an area in the vicinity of the driving-clock distribution lines LCLK2-0 to LCLK2-n and an area in the vicinity of the output side of the phase adjustment section 22 for adjusting the phase of the master clock signal MCK. Kept at a predetermined fixed electric potential such as the electric potential of the ground, the shield line LSLD2A is used for getting rid of undesirable effects such as the effect of interferences between the master-clock propagation line LMCK1A and the driving-clock propagation line LCLK1. In the same way, the data transfer system 30A shown in FIG. 8 also typically employs a shield line LSLD3A between the array of the select-signal generation sections 131-0 to 131-n and the driving-clock propagation line LCLK1. The shield line LSLD3A is joined to the shield line LSLD2A in the area in the vicinity of the output side of the phase adjustment section 22 and the shield line LSLD1A in an area in the vicinity of the output side of the driving-clock distribution line LCLK2-0. Kept at a predetermined fixed electric potential such as the electric potential of the ground, the shield line LSLD3A is used for getting rid of undesirable effects such as the effect of interferences between the array of the select-signal generation sections 131-0 to 131-n and the driving-clock propagation line LCLK1.

In addition, the data transfer system 30A shown in FIG. 8 also typically employs a shield line LSLD4A in such a way that the start-pulse propagation line LSTRT is sandwiched between the shield line LSLD4A and the shield line LSLD1A. Thus, the shield line LSLD4A is provided on the lowest side of FIG. 8. Since power-supply lines or the like are generally provided on the lowest side of the figure, the shield line LSLD4A is stretched between the start-pulse propagation line LSTRT and the power-supply lines or the like.

It is to be noted that, in the case of a configuration in which the master-clock propagation line LMCK1A is closer to the power-supply lines than the start-pulse propagation line LSTRT is, the shield line LSLD4A is stretched between the master-clock propagation line LMCK1A and the power-supply lines.

Figure 9:
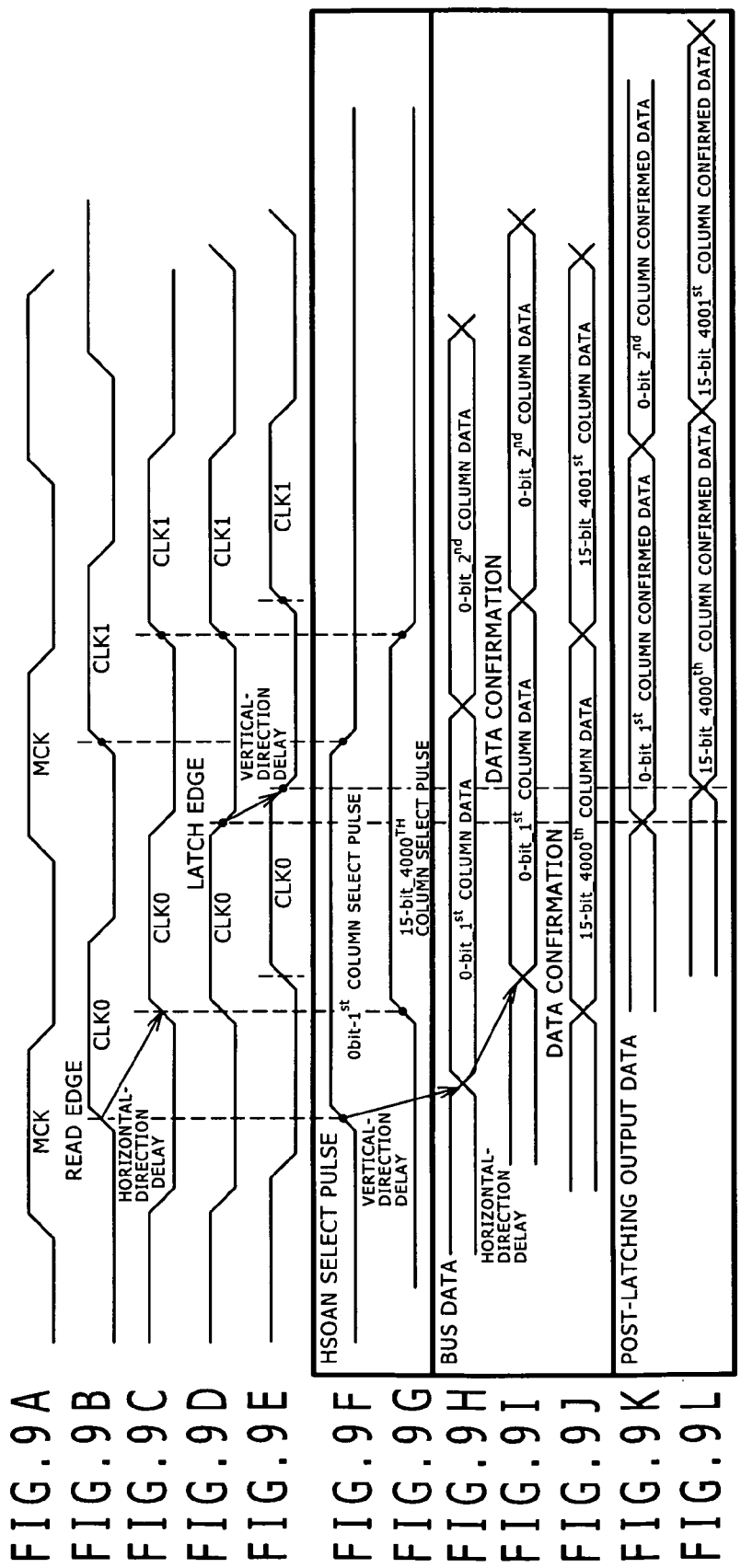
FIG. 9 shows timing charts of the data transfer system shown in FIG. 8.

FIG. 9 shows timing charts of the data transfer system 30A shown in FIG. 8.

FIG. 9A shows the timing chart of the waveform of the master-clock signal MCK generated by the master-clock generation section 21. FIG. 9B shows the timing chart of the waveform of the driving-clock signal CLK appearing on the driving-clock propagation line LCLK1 connected to the clock input terminal of the select-signal generation section 131-0 farthest from the data input terminals of the data outputting circuits 17-0 to 17-n, that is, the input terminals of the sense amplifier circuits 171-0 to 171-n employed in the data outputting circuits 17-0 to 17-n respectively. FIG. 9C shows the timing chart of the waveform of the driving-clock signal CLK appearing on the driving-clock propagation line LCLK1 connected to the clock input terminal of the select-signal generation section 131-n closest to the data input terminals of the data outputting circuits 17-0 to 17-n, that is, the input terminals of the sense amplifier circuits 171-0 to 171-n employed in the data outputting circuits 17-0 to 17-n respectively. FIG. 9D shows the timing chart of the waveform of the data acquiring clock signal SACK supplied to the clock input terminal of the data synchronization circuit 172-n employed in the data outputting circuit 17-n closest to the output of the phase adjustment section 22A. FIG. 9E shows the timing chart of the waveform of the data acquiring clock signal SACK supplied to the clock input terminal of the data synchronization circuit 172-0 employed in the data outputting circuit 17-0 farthest from the output of the phase adjustment section 22A. FIG. 9F shows the timing chart of the waveform of the select signal (or a select pulse) SEL0 output by the select-signal generation section 131-0 employed in the column scan circuit 13. FIG. 9G shows the timing chart of the waveform of the select signal (or a select pulse) SELn output by the select-signal generation section 131-n employed in the column scan circuit 13 where n is typically an integer having the value of 4,000. FIG. 9H shows the timing chart of imaging data transferred to the data transfer line 154-0 from the counter latch 152-0 provided at the uppermost layer. FIG. 9I shows the timing chart of imaging data transferred from the data transfer line 154-0 to the input terminal of the sense amplifier circuit 171-0 employed in the data outputting circuit 17-0 provided at the uppermost layer. FIG. 9J shows the timing chart of imaging data transferred from the data transfer line 154-n to the input terminal of the sense amplifier circuit 171-n employed in the data outputting circuit 17-n provided at the lowermost layer. FIG. 9K shows the timing chart of imaging data output by the data synchronization circuit 172-0 employed in the data outputting circuit 17-0 provided at the uppermost layer. FIG. 9L shows the timing chart of mage taking data output by the data synchronization circuit 172-n employed in the data outputting circuit 17-n provided at the lowermost layer.

In the data transfer system 30A shown in FIG. 8, the driving-clock propagation line LCLK1 and the data transfer lines (that is, the data bus) 154-0 to 154-n are laid out in such a way that the direction of the propagation of the driving-clock signal CLK along the driving-clock propagation line LCLK1 parallel to the array of the select-signal generation sections 131-0 to 131-n is the same as the direction of the transfer of imaging data from the counter latches 152-0 to 152-n to the sense amplifier circuits 171-0 to 171-n respectively through the data transfer lines 154-0 to 154-n. As is obvious from the timing charts shown in FIG. 9, variations of the time delay along the driving-clock propagation line LCLK1 passed through by the driving-clock signal CLK supplied to the select-signal generation sections 131-0 to 131-n in the column scan circuit 13 are compensated for by variations of the time delay along the data transfer lines (that is, the data bus) 154-0 to 154-n from the counter latches 152-0 to 152-n to the sense amplifier circuits 171-0 to 171-n respectively.

In addition, the data transfer system 30A shown in FIG. 8 is designed into a configuration that provides a fixed sum of the time delay caused by a segment of the driving-clock propagation line LCLK1 passed through by the driving-clock signal CLK to any particular one of the select-signal generation sections 131 in the column scan circuit 13 and the time delay caused by a segment of a data transfer line 154 as a time delay of propagation from the counter latch 152 on the same pixel column as the particular select-signal generation section 131 to the corresponding sense amplifier circuit 171 without regard to the location of the selected pixel column.

In such a configuration, a sufficient timing margin for driving the sense amplifier circuits 171-0 to 171-n and the data synchronization circuits 172-0 to 172-n can be read so that high-speed driving and read operations can be carried out.

The data transfer system 30A shown in FIG. 8 is further analyzed as follows. Let us assume that a pixel column N1 adjacent to (or in close proximity to) the data outputting circuit 17 is selected. In this case, a timing difference Tdiff_n between the data acquiring clock signal SACK and imaging data which are supplied to the data outputting circuit 17 is given as follows:

$$Tdiff\_n \approx T1$$

If a pixel column F1 far away from the data outputting circuit 17 is selected, on the other hand, a timing difference Tdiff_f between the data acquiring clock signal SACK and imaging data which are supplied to the data outputting circuit 17 is given as follows:

$$Tdiff\_f \approx T2$$

The physical layout is designed to set the relation $T1 \approx T2$ which provides the following equation.

$$Tdiff\_n \approx Tdiff\_f$$

That is to say, the timing difference Tdiff_between the clock signal and imaging data which are supplied to the data outputting circuit 17 is all but fixed without regard to the location of the selected pixel column. That is to say, the timing difference Tdiff_between the data acquiring clock signal SACK and imaging data is all but fixed and not dependent on the location of the selected pixel column.

Thus, the operating frequency F of the circuit provided at the preceding stage is given as follows:

$$F = 2 \times 1 (Tdiff\_f - Tdiff\_n) = \infty$$

This means that the upper limit of the actual operating frequency is rate-controlled by the upper-limit operating frequency of the preceding-stage circuit itself. That is to say, there is no timing restriction according to the location of the selected pixel column.

As described above, the data transfer system 30A shown in FIG. 8 is designed into a configuration that provides a fixed sum of the time delay caused by a segment of the driving-clock propagation line LCLK1 passed through by the driving-clock signal CLK to any particular one of the select-signal generation sections 131 in the column scan circuit 13 and the time delay caused by a segment of a data transfer line 154 as a time delay of propagation from the counter latch 152 on the same pixel column as the particular select-signal generation section 131 to the corresponding sense amplifier circuit 171 without regard to the location of the selected pixel column. Thus, a sufficient timing margin for each of driving the sense amplifier circuits 171-0 to 171-n and each of the data synchronization circuits 172-0 to 172-n can be assured so that high-speed driving and read operations can be carried out.

<Third Typical Configuration of the Data Transfer System>

Figure 10:
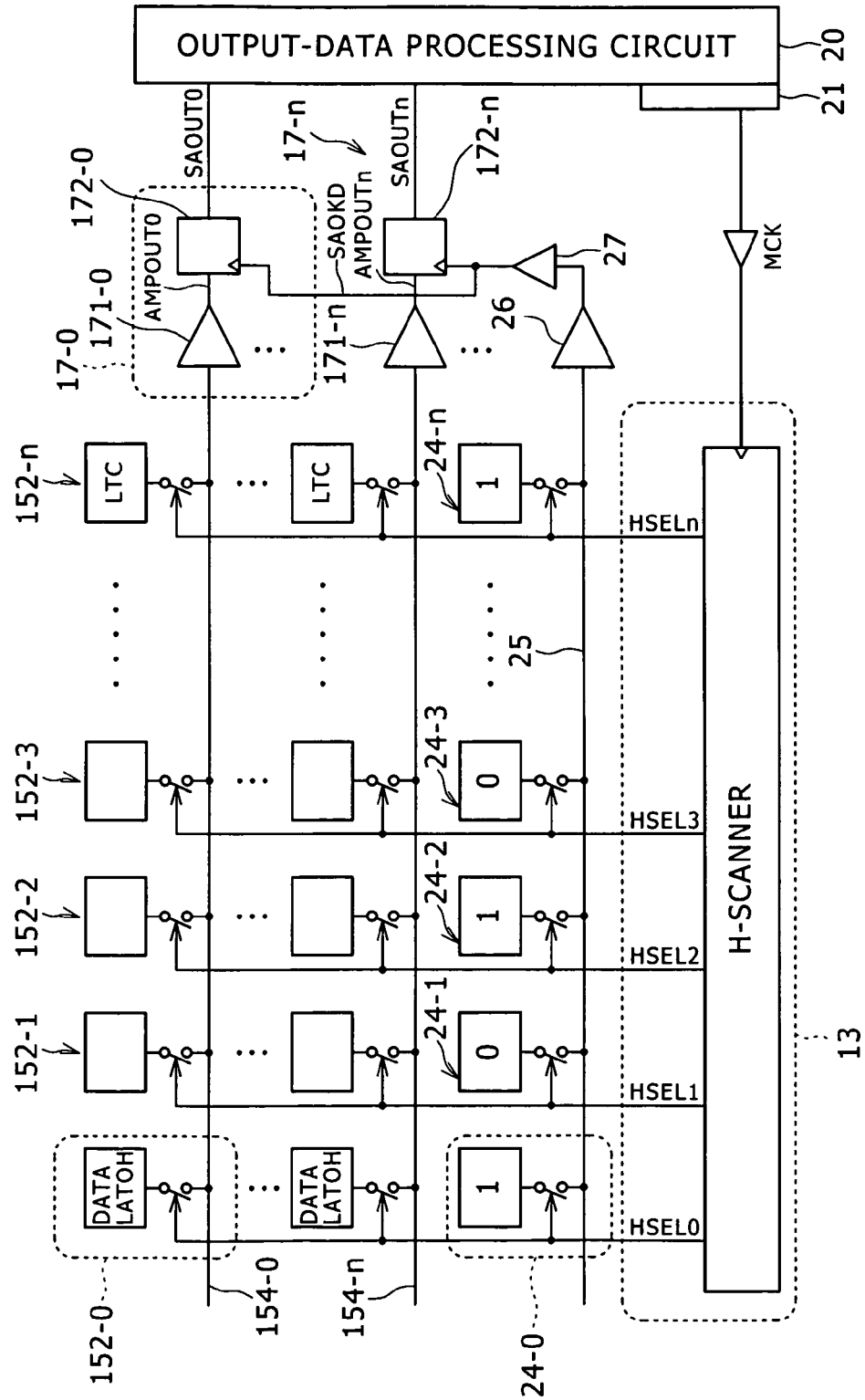
FIG. 10 is a diagram showing a third typical configuration of the data transfer system according to the embodiment.
Figure 11:
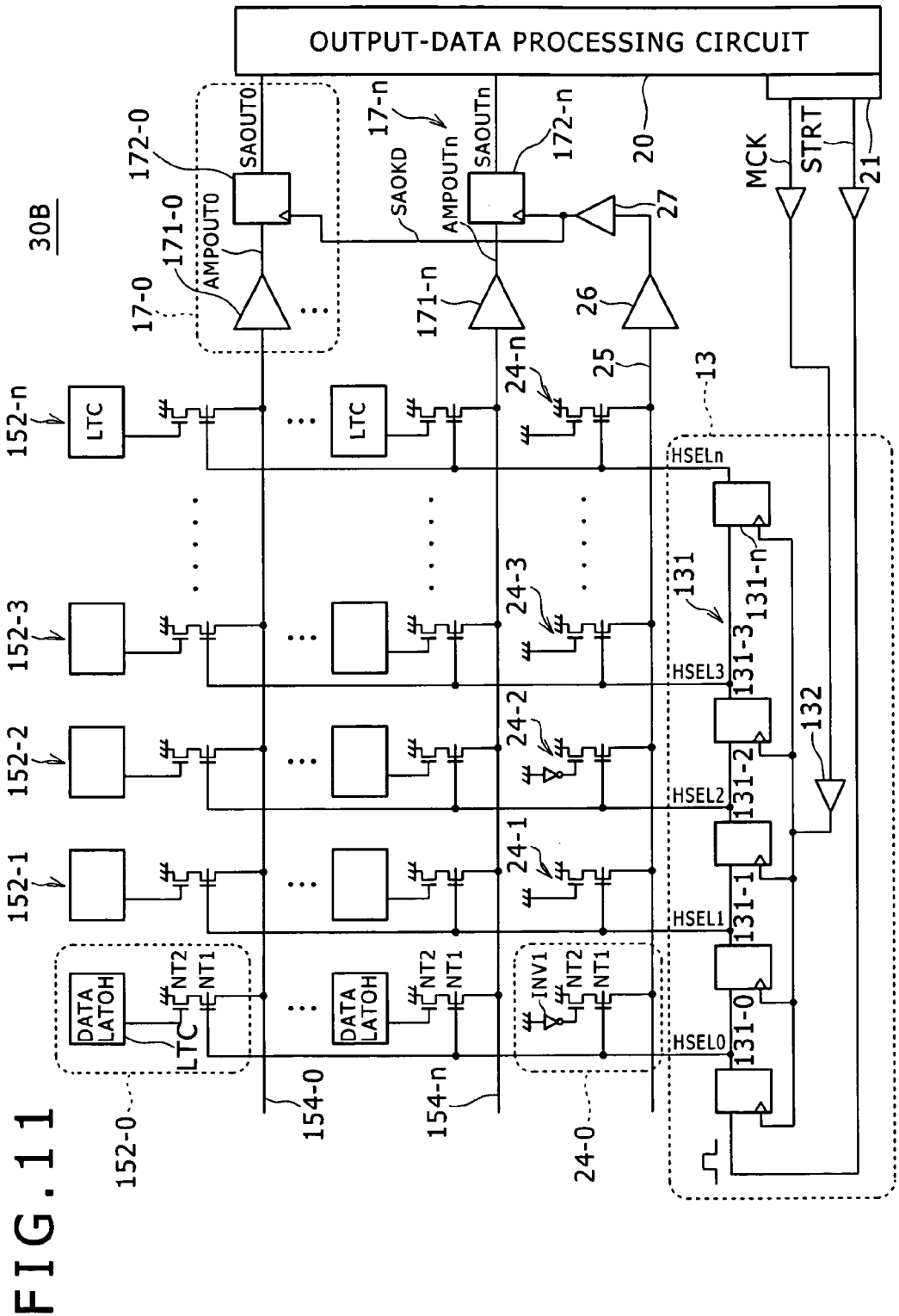
FIG. 11 is a diagram more concretely showing the third typical configuration of the data transfer system shown in FIG. 10 as a system according to the embodiment.

FIG. 10 is a diagram showing a third typical configuration of a data transfer system according to the embodiment. FIG. 11 is a diagram more concretely showing the circuit of the third typical configuration of the data transfer system 30B shown in FIG. 10 as a data transfer system according to the embodiment.

The data transfer system 30B shown in FIGS. 10 and 11 is configured to solve problems of data skews generated in a column (horizontal) scan operation. In particular, the data transfer system 30B shown in FIGS. 10 and 11 is configured to solve a problem of dependence of the transfer distance on the location of the pixel column.

First of all, the basic principle of the third typical configuration is explained by referring to FIG. 10.

The data transfer system 30B shown in FIG. 10 is different from the data transfer system 30 shown in FIG. 6 in that, in the case of the configuration of the data transfer system 30B shown in FIG. 10, in addition to the data storage sections (or the data latches shown in FIG. 10) for storing data bits of every counter latches 152, there are also provided pseudo-clock storage sections 24-0 to 24-n for storing a series of fixed data 1 . 0 . 1 . 0 . and so on. This fixed data is read on a pseudo-clock transfer line 25 at the same time as the imaging data is read on the data transfer lines 154.

In the data transfer system 30B, the fixed data appearing on the pseudo-clock transfer line 25 is supplied to the data synchronization circuits 172-0 to 172-n through a sense amplifier circuit 26 and a phase adjustment section 27 as a data-acquiring clock signal SACKD for determining timings to acquire the data AMPOUT [n:0] output by the sense amplifier circuits 171-0 to 171-n.

By designing the data transfer system 30B into such a configuration, the transfer distance of the imaging data propagating to the data outputting circuit 17 is equal to the transfer distance of the pseudo-clock signal to propagate the data outputting circuit 17 all the time. Thus, the transfer time delay caused by the transfer distance for the imaging data is always equal to the transfer time delay caused by the transfer distance for the pseudo-clock signal.

As a result, the skew component attributed to the transfer distance is eliminated. As described earlier, the skew component attributed to the transfer distance is a component pertaining to the fourth category of the four categories classifying skew components. Accordingly, the data acquiring margin is increased, allowing imaging data to be acquired in a stable manner.

FIG. 11 is a diagram showing the third typical configuration of the data transfer system 30B of FIG. 10 more concretely. As shown in FIG. 11, each of the pseudo-clock storage sections 24-0 to 24-n employed in the data transfer system 30B includes drive transistors DRV Tr having configuration identical with the configuration of the drive transistors DRV Tr provided at the output stage of each of the counter latches 152-0 to 152-n.

To put it concretely, each of the pseudo-clock storage sections 24-0 to 24-n employs an NMOS select transistor PNT1 and an NMOS data transistor PNT2 which are connected to each other to form a series circuit between a line having a predetermined electric potential such as the electric potential of the ground and the pseudo-clock transfer line 25.

The gate of the NMOS select transistor PNT1 is connected to one of the select lines SEL0 to SELn driven by the column scan circuit 13. On the other hand, the gate of the NMOS data transistor PNT2 on any even-numbered pixel column is connected to the ground potential through an inverter INV1. In the configuration shown in FIG. 11, the even-numbered pixel columns are pixel columns of the pseudo-clock storage sections 24-0, 24-2, . . . and 24-n−1.

On the other hand, the gate of the NMOS data transistor PNT2 on any odd-numbered pixel column is connected to the ground potential directly. In the configuration shown in FIG. 11, the odd-numbered pixel columns are pixel columns of the pseudo-clock storage sections 24-1, 24-3, . . . and 24-n.

As described above, in accordance with this embodiment, the configuration of each of the pseudo-clock storage sections 24-0 to 24-n is basically identical with the configuration of each of the counter latches 152-0 to 152-n. However, the configuration of each of the pseudo-clock storage sections 24-0 to 24-n does not include a latch for storing imaging data. In place of such a latch, the gate of the NMOS data transistor PNT2 receives a signal having a logic level of 1 output by the physically embedded inverter INV1 connected to the ground or a logic level of 0 generated by the ground. That is to say, the gates of the NMOS data transistors PNT2 receive the series of fixed data 1 . 0 . 1 . 0 . and so on mentioned before.

As described above, in accordance with this embodiment, it is possible to eliminate the position-dependent skew component caused by the transfer distance of the imaging data during the transfer of the data as a component pertaining to one of the four categories of skew components obstructing the efforts to raise the speed. Thus, this embodiment is capable of contributing to efforts to further raise the speed of the image sensor and/or further increase the size of the sensor.

In addition, since the imaging data and the pseudo clock signal are transferred through respectively the data transfer line 154 and the pseudo-clock transfer line 25 identical to the data transfer line 154, the embodiment provides a configuration capable of absorbing effects of process variations from chip to chip and/or from wafer to wafer relatively with ease. Thus, the yield can be improved. In addition, since the data acquiring margin in the synchronization process carried out by the data synchronization circuit 172 can be increased, the design work can be made simpler. Accordingly, the design sdperiod and the number of man hours can be reduced.

<Fourth Typical Configuration of the Data Transfer System>

Figure 12:
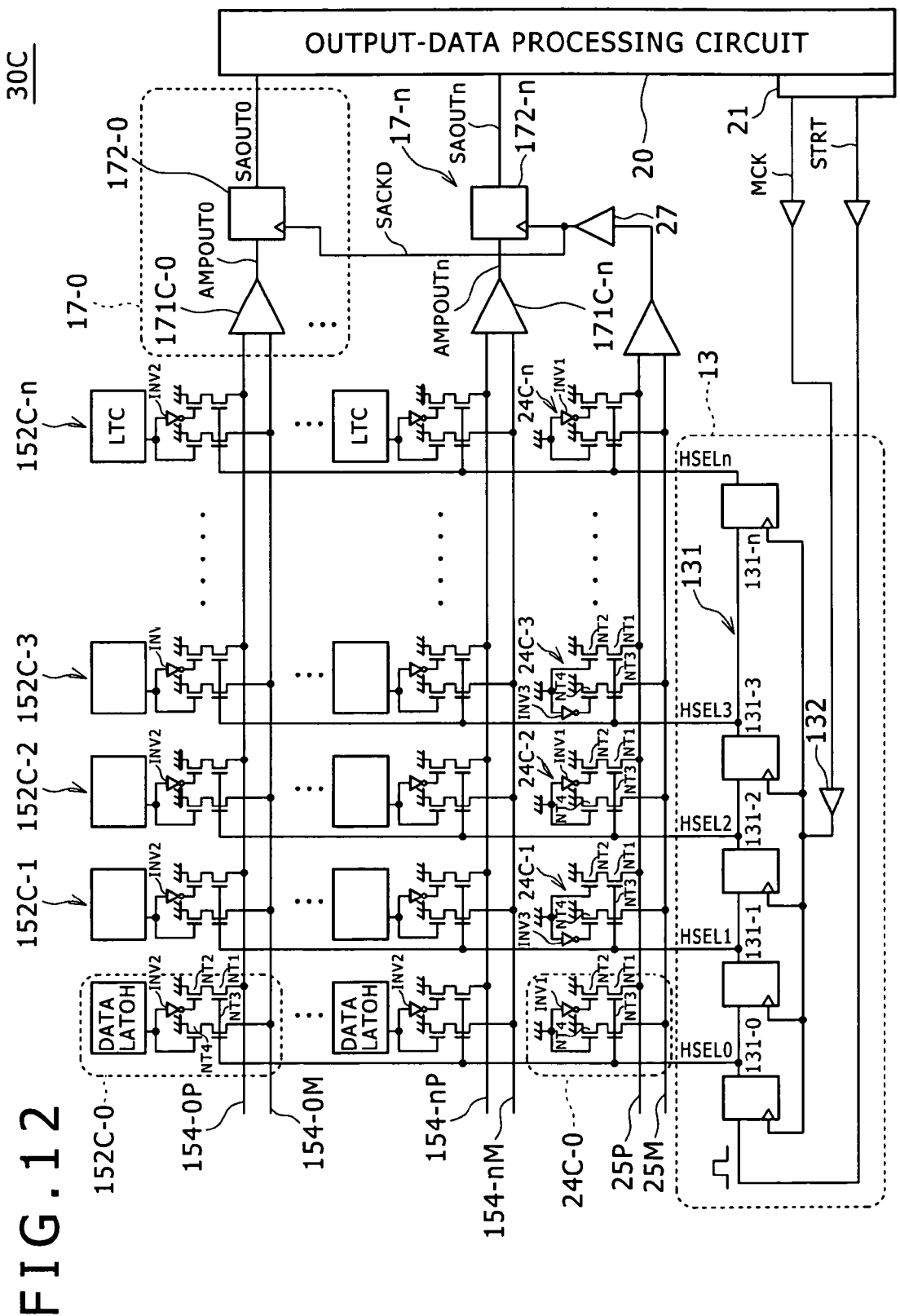
FIG. 12 is a diagram showing a fourth typical configuration of the data transfer system according to the embodiment.

FIG. 12 is a diagram showing a fourth typical configuration of a data transfer system according to the embodiment.

The data transfer system 30C shown in FIG. 12 is different from the data transfer system 30B shown in FIG. 11 in that the data transfer system 30C shown in FIG. 12 employs differential sense amplifier circuits 171C-0 to 171C-n in place of respectively the sense amplifier circuits 171-0 to 171-n included in the data transfer system 30B.

Otherwise, the configuration of the data transfer system 30C is all but identical with the configuration of the data transfer system 30B. Since the differential sense amplifier circuits 171C-0 to 171C-n are employed, however, 2 data transfer lines 154P and 154M as well as 2 pseudo-clock data transfer lines 25P and 25M are required for each data transfer channel. In addition, the counter latches 152C-0 to 152C-n on the same pixel column output complementary pieces of imaging data to the data transfer lines 154-0P and 154-0M to 154-nP and 154-nM respectively whereas the pseudo-clock storage sections 24C-0 to 24C-n output complementary pseudo-clock signals to the pseudo-clock data transfer lines 25P and 25M.

As shown in FIG. 12, the drive transistor circuit DRV Tr employed in each of the counter latches 152C-0 to 152C-n typically has an NMOS (n-channel MOS) select transistor NT1 and an NMOS data transistor NT2, which are connected to each other in series between the data transfer line 154-0P at the uppermost layer (or the data transfer line 154-nP at the lowermost layer) and a line having a predetermined electric potential such as the electric potential of the ground. The gate of the NMOS select transistor NT1 is connected to one of the select lines SEL0 to SELn driven by the column scan circuit 13. On the other hand, the gate of the NMOS data transistor NT2 is connected to the latch LTC included in the same series circuit cited before as the drive transistor circuit DRV Tr through an inverter INV2. In addition, the drive transistor circuit DRV Tr employed in each of the counter latches 152C-0 to 152C-n typically also has an NMOS (n-channel MOS) select transistor NT3 and an NMOS data transistor NT4, which are connected to each other in series between the data transfer line 154-0M at the uppermost layer (or the data transfer line 154-nM at the lowermost layer) and the line having the predetermined electric potential such as the electric potential of the ground. The gate of the NMOS select transistor NT3 is connected to one of the select lines SEL0 to SELn driven by the column scan circuit 13. On the other hand, the gate of the NMOS data transistor NT4 is connected directly to the latch LTC included in the same series circuit cited before as the drive transistor circuit DRV Tr.

As shown in FIG. 12, each of the pseudo-clock storage sections 24C-0 to 24C-n employs an NMOS select transistor PNT1 and an NMOS data transistor PNT2 which are connected to each other to form a series circuit between a line having a predetermined electric potential such as the electric potential of the ground and the pseudo-clock transfer line 25P.

The gate of the NMOS select transistor PNT1 is connected to one of the select lines SEL0 to SELn driven by the column scan circuit 13. On the other hand, the gate of the NMOS data transistor PNT2 on any even-numbered pixel column is connected to the ground potential through an inverter INV1. In the configuration shown in FIG. 12, the even-numbered pixel columns are pixel columns of the pseudo-clock storage sections 24C-0, 24C-2, . . . and 24-n−1.

On the other hand, the gate of the NMOS data transistor PNT2 on any odd-numbered pixel column is connected to the ground potential directly. In the configuration shown in FIG. 12, the odd-numbered pixel columns are pixel columns of the pseudo-clock storage sections 24C-1, 24-3, . . . and 24-n.

In addition, each of the pseudo-clock storage sections 24C-0 to 24C-n also employs an NMOS select transistor PNT3 and an NMOS data transistor PNT4 which are connected to each other to form a series circuit between the line having the predetermined electric potential such as the electric potential of the ground and the pseudo-clock transfer line 25M.

The gate of the PNT3 is connected to one of the select lines SEL0 to SELn driven by the column scan circuit 13. On the other hand, the gate of the PNT4 on any even-numbered pixel column is connected directly to the ground potential.

However, the gate of the PNT4 on any odd-numbered pixel column is connected to the ground potential through an inverter INV3.

In accordance with the embodiment shown in FIG. 12, by adoption of a differential configuration as descried above, in addition to the effects described so far, the data transfer system 30C also has an effect of increasing a noise margin so that it is also possible to effectively eliminate the skew component caused by noises during the transfer of imaging data as a component pertaining to the third one of the four categories of skew components.

<Fifth Typical Configuration of the Data Transfer System>

Figure 13:
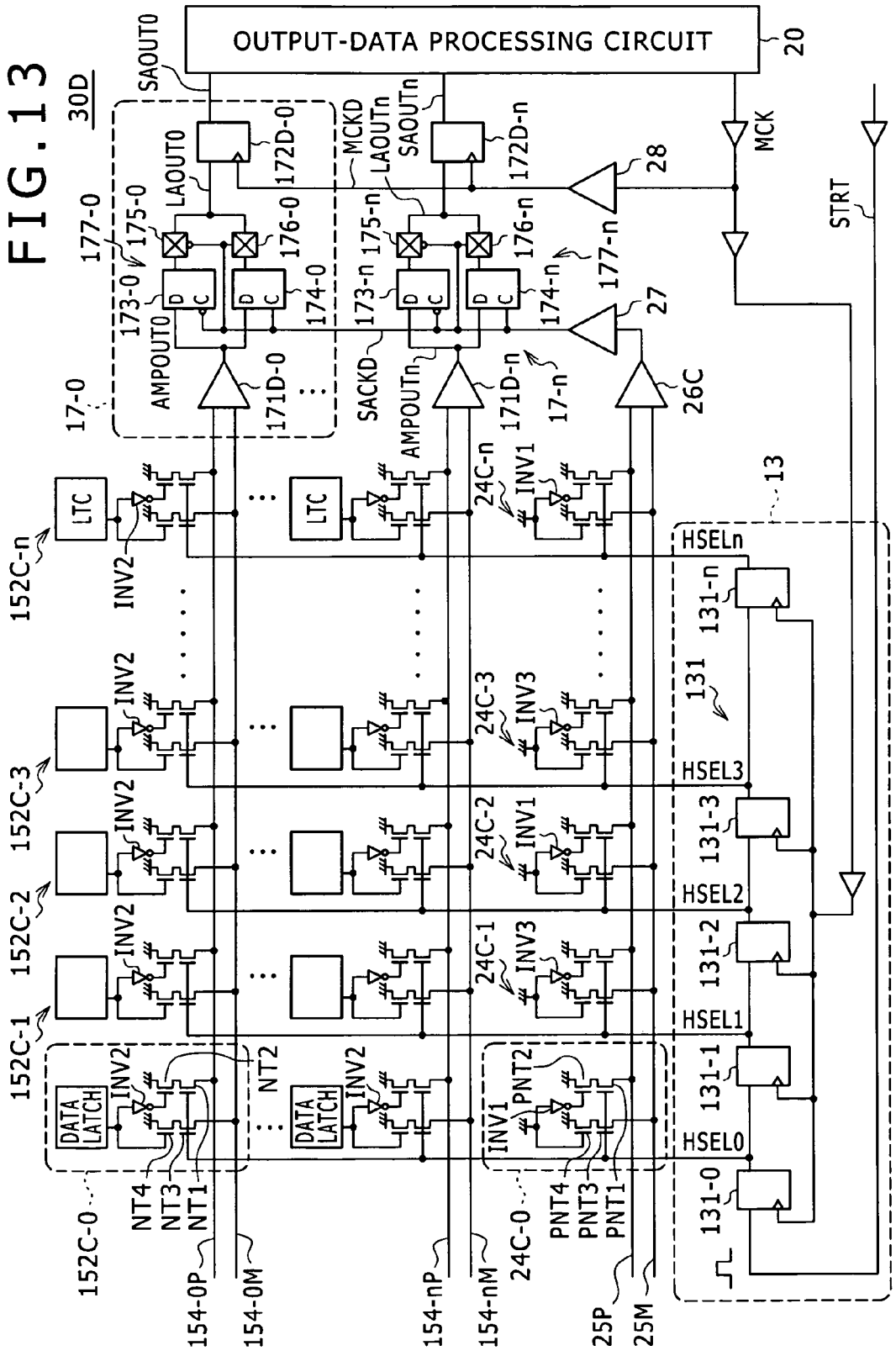
FIG. 13 is a diagram showing a fifth typical configuration of the data transfer system according to the embodiment.
Figure 14:
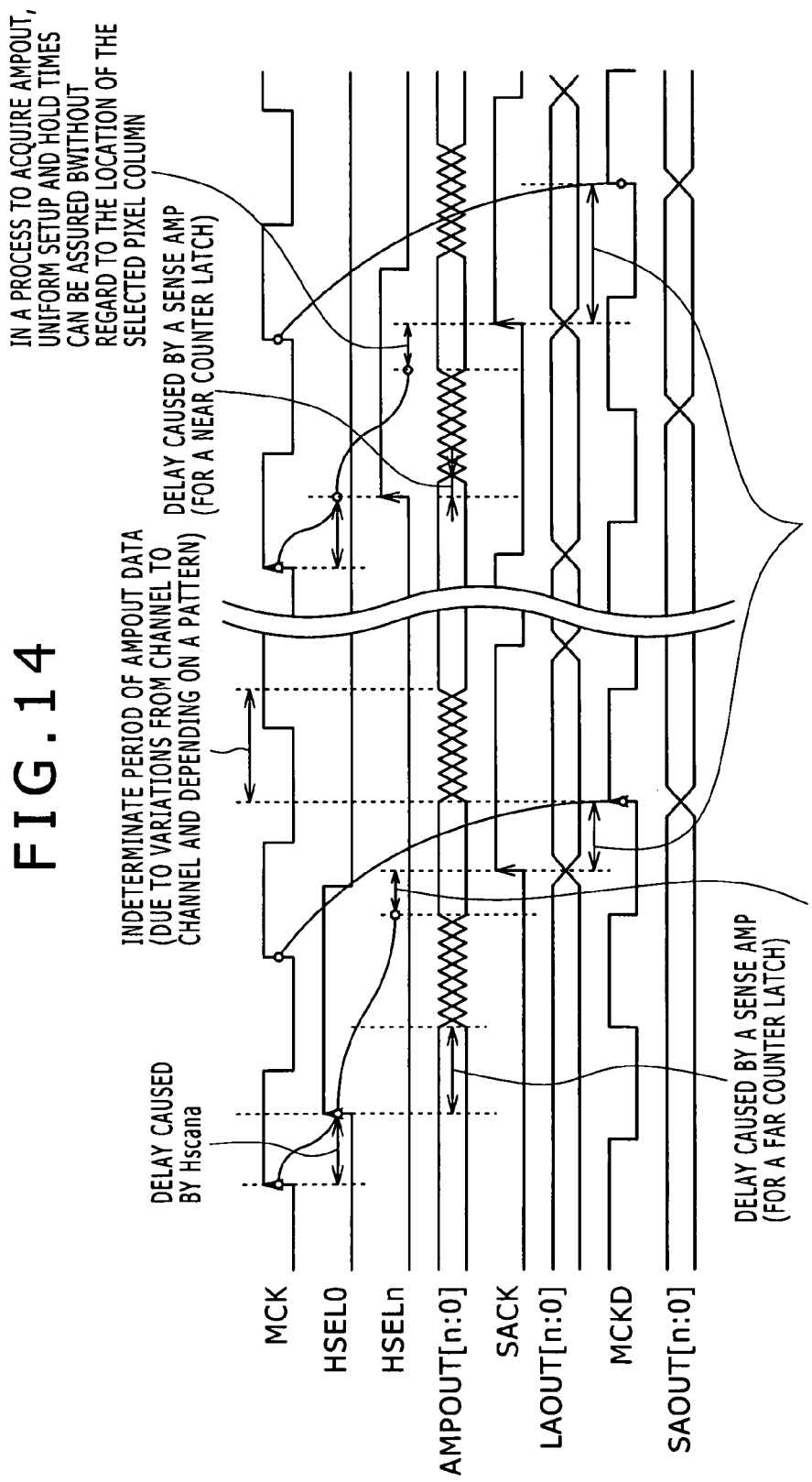
FIG. 14 shows timing charts of the data transfer system shown in FIG. 13.

FIG. 13 is a diagram showing a fifth typical configuration of a data transfer system according to the embodiment whereas FIG. 14 shows timing charts of the data transfer system 30D shown in FIG. 13.

The data transfer system 30D shown in FIG. 13 is different from the data transfer system 30C shown in FIG. 12 in that, in the case of the data transfer system 30D shown in FIG. 13, the operation to acquire imaging data in the data outputting circuit 17 is carried out on the level transition edges of the pseudo-clock signal. To put it concretely, the operation to acquire imaging data in the data outputting circuit 17 is carried out when the pseudo-clock signal makes a transition from the low level of 1 to the low level of 0 and when the pseudo-clock signal makes a transition from the low level of 0 to the low level of 1. In addition, in the configuration of the data transfer system 30D shown in FIG. 13, the master clock signal having the phase thereof adjusted by a phase adjustment section 28 is used as a second data acquiring clock signal MCKD for acquiring imaging data to be output to the output-data processing circuit 20.

The data outputting circuits 17D-0 to 17D-n employ sense amplifier circuits 171D-0 to 171D-n respectively, data synchronization circuits 172D-0 to 172D-n respectively, first latches 173-0 to 173-n respectively, second latches 174-0 to 174-n respectively, first switches 175-0 to 175-n respectively and second switches 176-0 to 176-n respectively. The first latch 173 and the first switch 175 together form a first series circuit whereas the second latch 174 and the second switch 176 together form a second series circuit. The first and second series circuits form a parallel circuit serving as a data acquiring circuit 177 between the sense amplifier circuit 171D and the data synchronization circuit 172D. That is to say, the data acquiring circuits 177-0 to 177-n are included in the data outputting circuits 17D-0 to 17D-n respectively.

To put it concretely, the outputs of the sense amplifier circuits 171D-0 to 171D-n are connected to the data input terminals of the first latches 173-0 to 173-n respectively and the second latches 174-0 to 174-n respectively. The inverted signal of a data acquiring clock signal SACKD generated by a phase adjustment section 27 is supplied to the clock input terminal of the first latches 173-0 to 173-n whereas the data acquiring clock signal SACKD itself is supplied to the clock input terminal of the second latches 174-0 to 174-n.

The outputs of the first latches 173-0 to 173-n are supplied to the data input terminals of the data synchronization circuits 172D-0 to 172D-n respectively by way of the first switches 175-0 to 175-n respectively. By the same token, the outputs of the second latches 174-0 to 174-n are also supplied to the same data input terminals of the data synchronization circuits 172D-0 to 172D-n respectively by way of the second switches 176-0 to 176-n respectively.

The inverted signal of the data acquiring clock signal SACKD is supplied to the inverted inputs of the first switches 175-0 to 175-n. The low level of the data acquiring clock signal SACKD keeps each of the first switches 175-0 to 175-n in a conductive state transferring imaging data latched in the first latches 173-0 to 173-n respectively to the data input terminals of the data synchronization circuits 172D-0 to 172D-n respectively.

On the other hand, the data acquiring clock signal SACKD itself is supplied to the inputs of the first switches 176-0 to 176-n. The high level of the data acquiring clock signal SACKD keeps each of the second switches 176-0 to 176-n in a conductive state transferring imaging data latched in the second latches 174-0 to 174-n respectively to the data input terminals of the data synchronization circuits 172D-0 to 172D-n respectively.

In this way, the first switches 175-0 to 175-n and the second switches 176-0 to 176-n are turned on and off in a complementary manner. As a result, the first switches 175-0 to 175-n transfer data latched in the first latches 173-0 to 173-n respectively to the data input terminals of the data synchronization circuits 172D-0 to 172D-n respectively whereas the second switches 176-0 to 176-n transfer data latched in the second latches 174-0 to 174-n respectively to the data input terminals of the data synchronization circuits 172D-0 to 172D-n respectively alternately in a complementary manner.

The following description explains a reason why the data outputting circuit 17D is so designed.

The shift register 131 employed in the column scan circuit 13 operates synchronously with the driving-clock signal CLK based on the master clock signal MCK. Typically, the driving-clock signal CLK is distributed among the select-signal generation sections 131-0 to 131-n employed in the shift register 131 through a clock tree including the buffer 132. In such a tree configuration, the wires for distributing the driving-clock signal CLK among the select-signal generation sections 131-0 to 131-n each tend to become long.

Thus, since the wires for distributing the driving-clock signal CLK among the select-signal generation sections 131-0 to 131-n employed in the shift register 131 each tend to become long due to the tree structure, it is feared that the select signals HSEL0, HSEL1, . . . and HSELn are output by the select-signal generation sections 131-0 to 131-n respectively at some time delays from the master-clock signal MCK.

The counter latches 152-0 to 152-n selected by the select signals HSEL0, HSEL1, . . . and HSELn respectively assert imaging data on the data transfer lines 154-0 to 154-n (or strictly speaking, the data transfer lines 154-0P to 154-nP and 154-0M to 154-nM) respectively in a current mode. By the same token, the pseudo-clock storage sections 24-0 to 24-n also selected by the select signals HSEL0, HSEL1, . . . and HSELn respectively assert pseudo-clock signals on the pseudo-clock data transfer lines 25 (or strictly speaking, the pseudo-clock data transfer lines 25P and 25M) in the current mode. Since the data transfer lines 154-0P to 154-nP and 154-0M to 154-nM as well as the pseudo-clock data transfer lines 25P and 25M each have a non-zero input impedance, even if the imaging data and the pseudo-clock signals are asserted on the data transfer lines 154-0 to 154-n and the pseudo-clock data transfer lines 25 in the current mode, some voltage variations are generated.

Thus, for each of the data transfer lines 154-0 to 154-n and the pseudo-clock data transfer lines 25, an electric-charging period according to a time constant determined by the parasitic capacitance and parasitic resistance of the data transfer line is required. However, the time constant corresponding to the pixel column farthest from the sense amplifier circuit 171 is largest whereas the time constant corresponding to the pixel column closest to the sense amplifier circuit 171 is smallest, hence, the longer the electric-charging period. This difference in electric-charging period gives rise to a difference in imaging data/pseudo-clock signal transfer time delay between far and close pixel columns.

In order to solve this problem of differences in imaging data/pseudo-clock signal transfer time delay between far and close pixel columns, the pseudo-clock signal for acquiring imaging data is transmitted from the pseudo-clock storage sections 24C-0 to 24C-n through the pseudo-clock data transfer lines 25P and 25M to the data outputting circuit 17 in the same configuration as the configuration for transmitting the imaging data from the counter latches 152-0 to 152-n to the data outputting circuit 17 through the data transfer lines 154P and 154M. As shown in the timing charts of FIG. 14, since the pseudo clock signal is transmitted from the pseudo-clock storage sections 24C-0 to 24C-n embedded in the same way as the counter latches 152-0 to 152-n, however, as a clock signal, the pseudo-clock signal can have only a frequency not higher than half the frequency of the master-clock signal MCK much like the frequency of the operation to output the imaging data.

Thus, when the data acquiring clock signal SACKD is used as a clock signal for acquiring imaging data AMPOUT, the data AMPOUT needs to be acquired on both the rising and falling edges of the signal. The configuration shown in FIG. 13 includes the typical data acquiring circuits 177-0 to 177-n described earlier.

The data acquiring circuits 177-0 to 177-n each include 2 latches, i.e., the first and second latches 173 and 174 for latching imaging data AMPOUT on respectively the falling and rising edges of the data acquiring clock signal SACKD and holding the data AMPOUT during respectively the low and high levels of the signal SACKD. The data acquiring circuits 177-0 to 177-n each also include 2 switches, i.e., the first and second switches 175 and 176 for selecting the output of the first latch 173 or the output of the second latch 174 during respectively the low and high levels of the data acquiring clock signal SACKD.

To put it in detail, the data acquiring clock signal SACKD is supplied to the first latches 173-0 to 173-n and the second latches 174-0 to 174-n. On the rising edge of the data acquiring clock signal SACKD, the imaging data AMPOUT is transferred from the sense amplifier circuits 171D-0 to 171D-n to the second latches 174-0 to 174-n respectively and held in the second latches 174-0 to 174-n during the high level of the signal SACKD. During the high level of the data acquiring clock signal SACKD, the second switches 176-0 to 176-n provided at a stage succeeding the second latches 174-0 to 174-n respectively are each in a conductive state, passing on the imaging data AMPOUT from the second latches 174-0 to 174-n respectively to the data synchronization circuits 172D-0 to 172D-n respectively as pieces of data LAOUT0 to LAOUTn respectively.

On the falling edge of the data acquiring clock signal SACKD, on the other hand, the imaging data AMPOUT is transferred from the sense amplifier circuits 171D-0 to 171D-n to the first latches 173-0 to 173-n respectively and held in the first latches 173-0 to 173-n during the low level of the signal SACKD. During the low level of the data acquiring clock signal SACKD, the second switches 176-0 to 176-n are each in a nonconductive state but the first switches 175-0 to 175-n provided at a stage succeeding the first latches 173-0 to 173-n respectively are each in a conductive state, passing on the imaging data AMPOUT from the first latches 173-0 to 173-n respectively to the data synchronization circuits 172D-0 to 172D-n respectively as pieces of imaging data LAOUT0 to LAOUTn respectively.

As described above, the imaging data AMPOUT can be acquired and synchronized by making use of two edges, that is, the rising and falling edges of the data acquiring clock signal SACKD. It is to be noted that, since the data acquiring circuit 177 for acquiring and synchronizing the imaging data AMPOUT includes merely 2 latches, i.e. the first and second latches, and 2 switches, i.e., the first and second switches, the data acquiring circuit 177 can be designed to have an area approximately equal to that of a circuit employing ordinary F/Fs (flip flops).

Since the pseudo-clock signal basically has a transfer time delay equal to the transfer time delay of the imaging data without regard to the location of the selected pixel column, the pseudo-clock signal is generated at the same phase as the data. With the pseudo-clock signal used as it is as a data acquiring clock signal, however, it is feared that the imaging data is acquired as imaging data AMPOUT inevitably during an indeterminate period including a sequence of blurring edges of the data. In order to solve this problem, the phase adjustment section 27 is used for appropriately adjusting the phase of the pseudo-clock signal to generate the data acquiring clock signal SACKD which assures proper setup and hold times in an operation to latch the imaging AMPOUT.

In this way, in comparison with the timing charts shown in FIG. 7 as the timing charts of the first typical configuration of the data transfer system 30, the setup and hold times assured by the data acquiring clock signal SACKD for the imaging data AMPOUT [n:0] output by the sense amplifier circuits 171-0 to 171-n can each be set at a fixed value without regard to whether the selected pixel column is a column far away from or in close proximity to the data outputting circuit 17.

The data LAOUT [n:0] obtained as a result of a latching operation carried out synchronously with the data acquiring clock signal SACKD no longer includes skew components pertaining to the first, second and third categories of the four categories explained before, As described earlier, skew components pertaining to the first category are caused by transfer time delay variations attributed to the so-called fabrication-process variations and skew components pertaining to the second category are caused by transfer time delay variations attributed to the pattern of imaging data transferred. The third category includes skew components caused by noises.

Since the imaging data LAOUT [n:0] is obtained as a result of a latching operation carried out synchronously with the data acquiring clock signal SACKD, however, it is feared that the imaging data LAOUT still includes skew components pertaining to the fourth category. As described earlier, the skew components pertaining to the fourth category are skew components caused by transfer time delay variations attributed to differences in physical distance to the sense amplifier circuit 171 between the data latches 152 as time delay variations taking the master-clock signal MCK as a reference. Since the imaging data LAOUT must be delivered finally to the output-data processing circuit 20 which is driven to operate by the master-clock signal MCK, it is necessary to synchronize the imaging data LAOUT by making use of the master-clock signal MCK and the data synchronization circuit 172D.

It is possible to provide a configuration making use of the master-clock signal MCK itself to synchronize the imaging data LAOUT still including the remaining skew components pertaining to the fourth category as skew components caused by transfer time delay variations attributed to differences in physical distance to the sense amplifier circuit 171 between the data latches 152. In the configuration shown in FIG. 13, however, a data reacquiring master clock signal MCKD is generated by a phase adjustment section 28 from the master-clock signal MCK as a signal having a phase computed from the phase of the master-clock signal MCK and as a signal used to finally synchronize the imaging data LAOUT including the remaining skew components pertaining to the fourth category as they are.

In the configuration shown in the figure, the data reacquiring clock signal MCKD is merely utilized for acquiring the imaging data LAOUT [n:0] by storing the imaging data LAOUT in ordinary F/Fs serving as the data synchronization circuits 172D-0 to 172D-n. Nevertheless, the phase of the data reacquiring clock signal MCKD is set and used for giving a most optimum timing in conjunction with the phase of the data acquiring clock signal SACKD. Since the phase of the data reacquiring clock signal MCKD is computed by taking the phase of the master-clock signal MCK as a reference, the data reacquiring clock signal MCKD does not include position-dependent components.

Due to position-dependent components of the data acquiring clock signal SACKD, the margins of the setup and hold times vary from column to column. Since skew components pertaining to the three of the four categories have been eliminated from the imaging data LAOUT, however, in comparison with the first typical configuration shown in FIG. 7 as a configuration in which the data acquiring clock signal SACK is used in a synchronization process to simultaneously eliminate skew components pertaining to all the four categories, the configuration shown in FIG. 13 is capable of carrying out a synchronization process to result in adequate margins of the setup and hold times.

In the configuration shown in FIG. 13, skew components are eliminated by dividing the four categories of skew components into a first group including skew components pertaining to the first, second and third categories and a second group which is the fourth category. As described earlier, skew components pertaining to the first category are caused by transfer time delay variations attributed to the so-called fabrication-process variations and skew components pertaining to the second category are caused by transfer time delay variations attributed to the pattern of data transferred. On the other hand, the third category includes skew components caused by noises whereas the fourth category includes skew components caused by transfer time delay variations attributed to differences in physical distance to the sense amplifier circuit 171 between the data latches 152 as delay variations taking the master-clock signal MCK as a reference. Then, the data acquiring clock signal SACKD is used in a synchronization process to eliminate skew components pertaining to the first group whereas the data reacquiring clock signal MCKD is used in a synchronization process to eliminate skew components pertaining to the second group. Thus, the configuration shown in FIG. 13 can be said to be capable of increasing the margins of the setup and hold times in the process to acquire the imaging data LAOUT.

By the way, in some of the embodiments described above, the phase adjustment section 22 (strictly speaking, the phase adjustment sections 22, 22A, 27 and 28) adjusts the phase of the master clock signal MCK in a process to adjust time delays by considering propagation delays generated in the column scan circuit 13 as propagation delays of the master clock signal MCK propagating through the column scan circuit 13. The phase adjustment section 22 also considers time delays generated in operations to transfer imaging data from the counter latches 152-0 to 152-n to the data outputting circuits 17-0 to 17-n respectively through the data transfer lines 154-0 to 154-n respectively as driven by respectively the select signals HSEL0 to HSELn appearing on the select lines SEL0 to SELn respectively in accordance with the driving-clock signal CLK. Thus, imaging data can be acquired with a high degree of precision.

However, the propagation delays generated in the column scan circuit 13 as propagation delays of the master clock signal MCK propagating through the column scan circuit 13 are mainly caused by wire loads of the driving-clock propagation line LCLK1 and the data transfer lines 154-0 to 154-n whereas time delays generated in the operation carried out by the phase adjustment section 22 (strictly speaking, the phase adjustment sections 22, 22A, 27 and 28) to generate the data acquiring clock signal SACK by delaying the master-clock signal MCK for a phase adjustment purpose are dependent on driving powers of transistors. That is to say, it is necessary to provide a large timing margin to the column scan circuit 13 in order to carry out the operation to acquire imaging data with a high degree of precision even if the two delay causes independent of each other vary.

The following description explains a typical configuration for implementing another method for assuring a time margin.
<Sixth Typical Configuration of the Data Transfer System>

Figure 15:
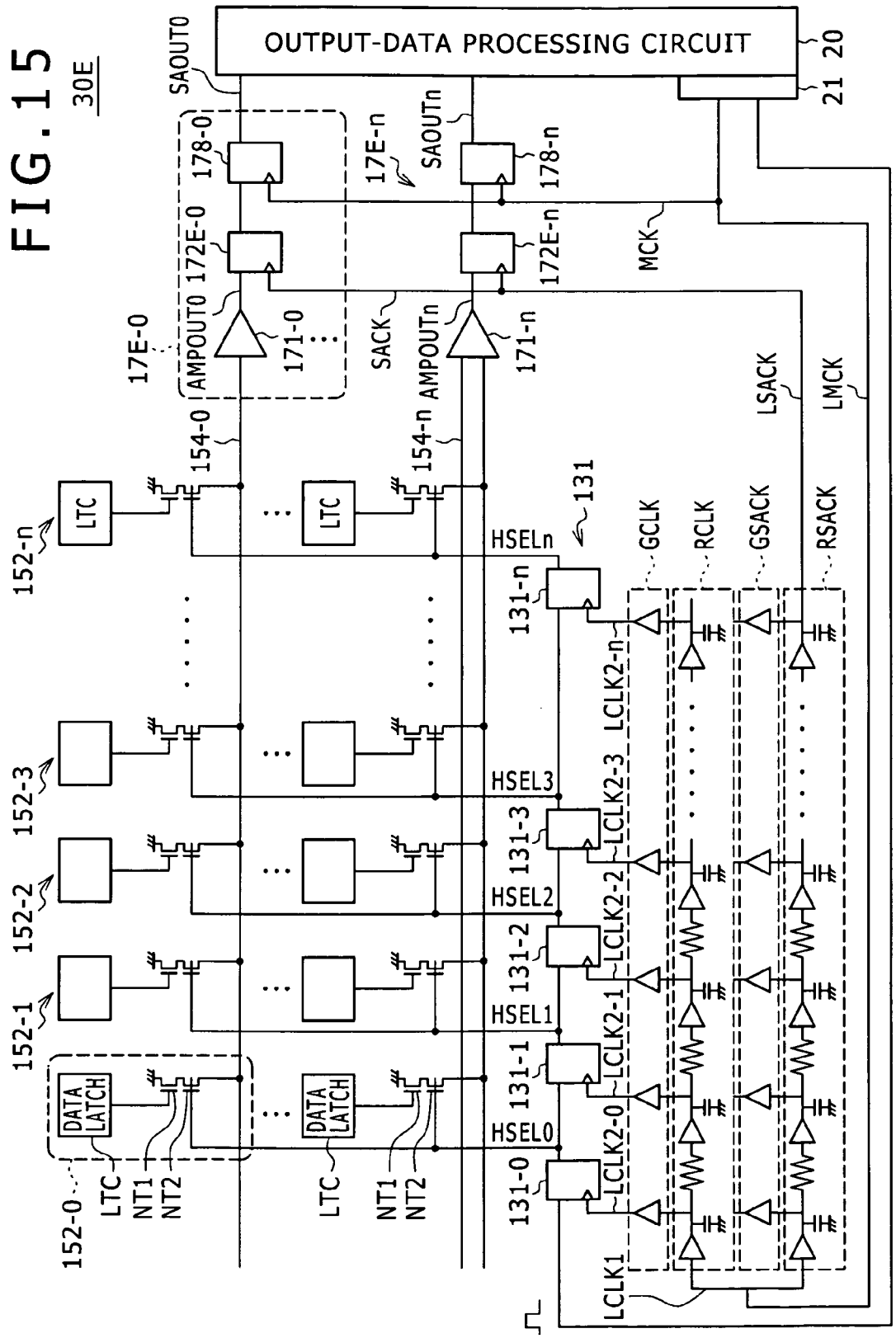
FIG. 15 is a diagram showing a sixth typical configuration of the data transfer system according to the embodiment.

FIG. 15 is a diagram showing a sixth typical configuration of a data transfer system according to the embodiment. The data transfer system 30E shown in FIG. 15 is obtained by improving the first typical configuration of the data transfer system 30 shown in FIG. 6. The data transfer system 30E shown in FIG. 15 has the following different points from the data transfer system 30 shown in FIG. 6.

In the first place, the data outputting circuit 17E employs 2 F/Fs provided at 2 different stages respectively. The first F/F provided at the preceding stage serves as a data synchronization circuit 172E for acquiring the output of the sense amplifier circuit 171 synchronously with the data acquiring clock signal SACK. The second F/F provided at the succeeding stage serves as a final data outputting circuit 178 for outputting imaging data, which has been acquired by the data synchronization circuit 172E from the sense amplifier circuit 171, synchronously with the master-clock signal MCK.

Thus, the data synchronization circuit 172E is capable of acquiring (or latching) imaging data from the sense amplifier circuit 171 with a high degree or reliability synchronously with the data acquiring clock signal SACK whereas the final data outputting circuit 178 is capable of outputting the imaging data, which has been acquired by the data synchronization circuit 172E from the sense amplifier circuit 171, synchronously with the master-clock signal MCK. As a result, a phase relation between the data outputting circuit 17E and the output-data processing circuit 20 can be assured.

In the second place, the driving-clock propagation line LCLK1 serving as the line for propagating the driving-clock signal CLK has a wire load approximately equal to the wire load of a line LSACK for propagating the data acquiring clock signal SACK. In the configuration shown in FIG. 15, reference notation RCLK denotes the wire load of the driving-clock propagation line LCLK1 whereas reference notation RSACK denotes the wire load of the data acquiring clock propagation line LSACK. As shown in the figure, the wire loads are each shown in the form of a circuit employing resistors and capacitors.

That is to say, the sixth typical configuration of the data transfer system 30E shown in FIG. 15 is designed to employ the driving-clock propagation line LCLK1 and the data acquiring clock propagation line LSACK having the wire load RSACK approximately equal to the wire load RCLK borne by the driving-clock propagation line LCLK1 so as to make elements delaying the driving-clock signal CLK identical with elements delaying the data acquiring clock signal SACK. Thus, it is possible to establish a fixed relation between a scan operation carried out synchronously with the driving-clock signal CLK in the column scan section 13 and a data acquiring (or latching) operation carried out synchronously with the data acquiring clock signal SACK in the data outputting section 17.

By the way, a plurality of points on the driving-clock propagation line LCLK1 are connected to gates for driving the shift register 131. Receiving the driving-clock signal CLK from the driving-clock propagation line LCLK1, the gates connected to the points on the driving-clock propagation line LCLK1 serve as another load to be borne by the driving-clock propagation line LCLK1. In the sixth typical configuration of the data transfer system 30E shown in FIG. 15, this other gate load borne by the driving-clock propagation line LCLK1 is denoted by reference notation GCLK.

In the sixth typical configuration of the embodiment, the data acquiring clock propagation line LSACK is also provided with a gate load GSACK similar to the gate load GCLK borne by the driving-clock propagation line LCLK1 so as to make elements delaying the data acquiring clock signal SACK identical with elements delaying the driving-clock signal CLK. Since the elements delaying the driving-clock signal CLK are identical with elements delaying the data acquiring clock signal SACK, it is possible to establish a fixed relation between a scan operation carried out synchronously with the driving-clock signal CLK in the column scan section 13 and a data acquiring (or latching) operation carried out synchronously with the data acquiring clock signal SACK in the data outputting section 17.

As described above, the sixth typical configuration of the data transfer system 30E shown in FIG. 15 as a system according to the embodiment is designed to employ the driving-clock propagation line LCLK1 and the data acquiring clock propagation line LSACK having the wire load RSACK approximately equal to the wire load RCLK borne by the driving-clock propagation line LCLK1 so as to make elements delaying the driving-clock signal CLK identical with elements delaying the data acquiring clock signal SACK. Thus, it is possible to establish a fixed relation between a scan operation carried out synchronously with the driving-clock signal CLK in the column scan section 13 and a data acquiring (or latching) operation carried out synchronously with the data acquiring clock signal SACK in the data outputting section 17. As a result, no phase adjustment section is required and the time delaying element of such a phase adjustment section can therefore be eliminated. Accordingly, it is possible to establish a fixed relation between a scan operation carried out synchronously with the driving-clock signal CLK in the column scan section 13 and a data acquiring (or latching) operation carried out synchronously with the data acquiring clock signal SACK in the data outputting section 17.

<Seventh Typical Configuration of the Data Transfer System>

Figure 16:
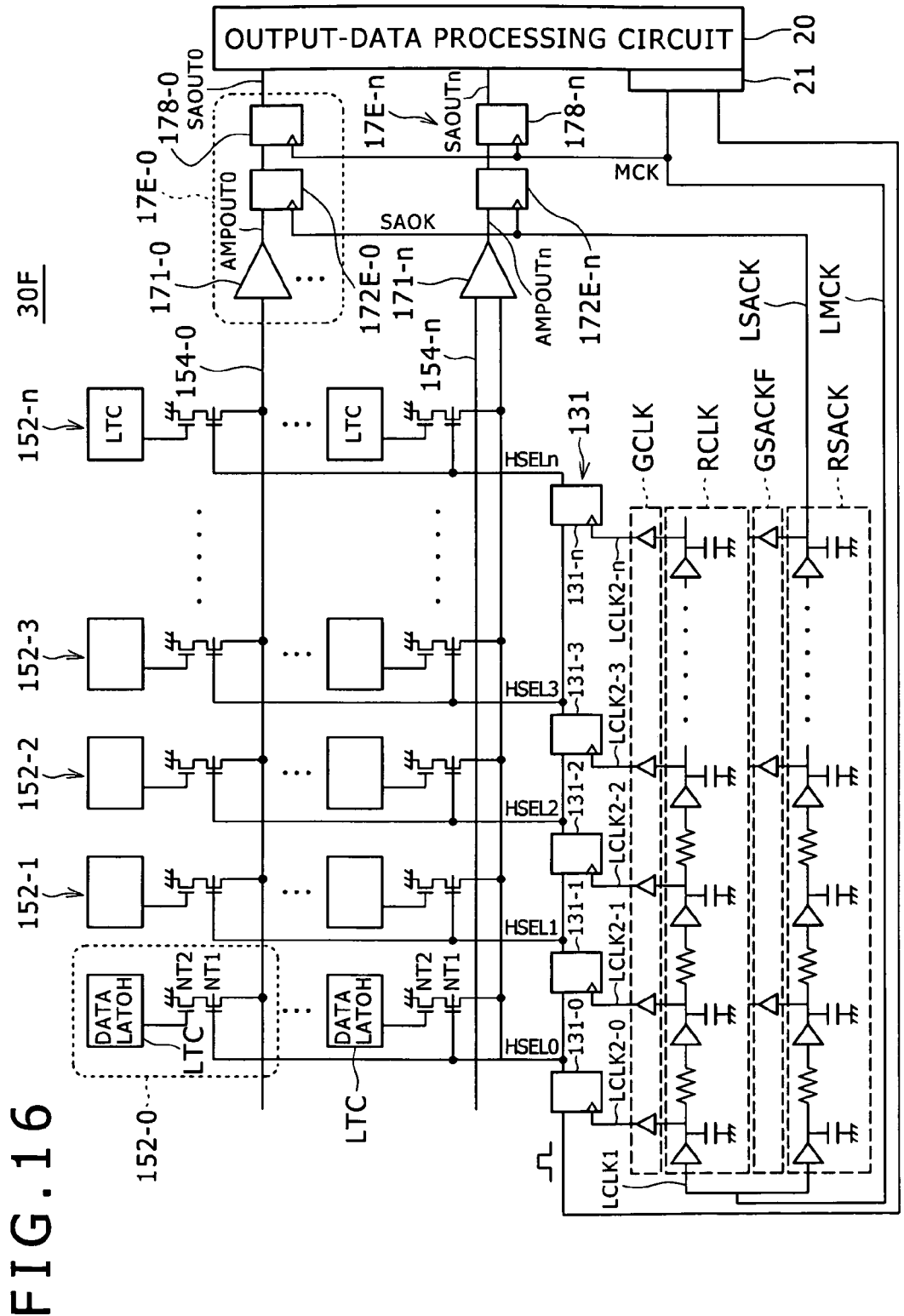
FIG. 16 is a diagram showing a seventh typical configuration of the data transfer system according to the embodiment.

Next, a seventh typical configuration of the data transfer system 30F according to the embodiment is explained by referring to FIG. 16. FIG. 16 is a diagram showing the seventh typical configuration of the data transfer system 30F according to the embodiment.

The seventh typical configuration of the data transfer system 30F shown in FIG. 16 is different from the sixth typical configuration of the data transfer system 30E shown in FIG. 15 in that, in the case of the seventh typical configuration of the data transfer system 30F, the gate load GSACKF borne by the data acquiring clock propagation line LSACK is small in comparison with the gate load GSACK borne by the data acquiring clock propagation line LSACK in the data transfer system 30E.

The data transfer system 30F is configured to have the gate load GSACKF adjustable to any value in a range of 0 to an upper limit equal to the gate load GCLK with a high degree of freedom.

Since the wire load RCLK borne by the driving-clock propagation line LCLK1 and the wire load RSACK borne by the data acquiring clock propagation line LSACK are equal to each other as their counterpart wire loads in the sixth typical configuration are equal to each other as described above, the timing of the driving-clock signal CLK to enter the shift register 131 is different from the timing of the image data AMPOUT to be latched in the data synchronization circuit 172 synchronously with the data acquiring clock signal SACK by a time delay caused by a difference between the gate load GCLK borne by the driving-clock propagation line LCLK1 and the gate load GSACK borne by the data acquiring clock propagation line LSACK. To put it concretely, in comparison with the data acquiring clock signal SACK, the driving-clock signal CLK is delayed by a time delay quantity according to the difference between the gate load GCLK borne by the driving-clock propagation line LCLK1 and the gate load GSACK borne by the data acquiring clock propagation line LSACK.

In the case of the sixth typical configuration of the data transfer system 30E described above, the propagation time delay caused by the wire load RCLK borne by the driving-clock propagation line LCLK1 for propagating the driving-clock signal CLK and caused also by the gate load GLCK borne by the driving-clock propagation line LCLK1 may not match the propagation time delay caused by the wire load RSACK borne by the data acquiring clock propagation line LSACK for propagating the data acquiring clock signal SACK and caused also by the gate load GSACK borne by the data acquiring clock propagation line LSACK. However, the data transfer system 30F is designed into the seventh typical configuration in which the gate load GSACKF borne by the data acquiring clock propagation line LSACK can be adjusted to any value in a range of 0 to an upper limit equal to the gate load GLCK with a high degree of freedom as described above. That is to say, the sum of the wire load RSACK borne by the data acquiring clock propagation line LSACK and the gate load GSACKF also borne by the data acquiring clock propagation line LSACK can be adjusted with a high degree of freedom. Thus, in the case of the seventh typical configuration of the data transfer system 30F, the propagation time delay caused by the wire load RCLK borne by the driving-clock propagation line LCLK1 for propagating the driving-clock signal CLK and caused also by the gate load GLCK borne by the driving-clock propagation line LCLK1 always matches the propagation time delay caused by the wire load RSACK borne by the data acquiring clock propagation line LSACK for propagating the data acquiring clock signal SACK and caused also by the gate load GSACKF borne by the data acquiring clock propagation line LSACK. As a result, it is possible to well establish a reliably fixed relation between a data read operation carried out to read imaging data from the counter latch 152 to the data transfer line 154 synchronously with the driving-clock signal CLK and a data acquiring (or latching) operation carried out in the data outputting circuit 17 synchronously with the data acquiring clock signal SACK.

<Eighth Typical Configuration of the Data Transfer System>

Figure 17:
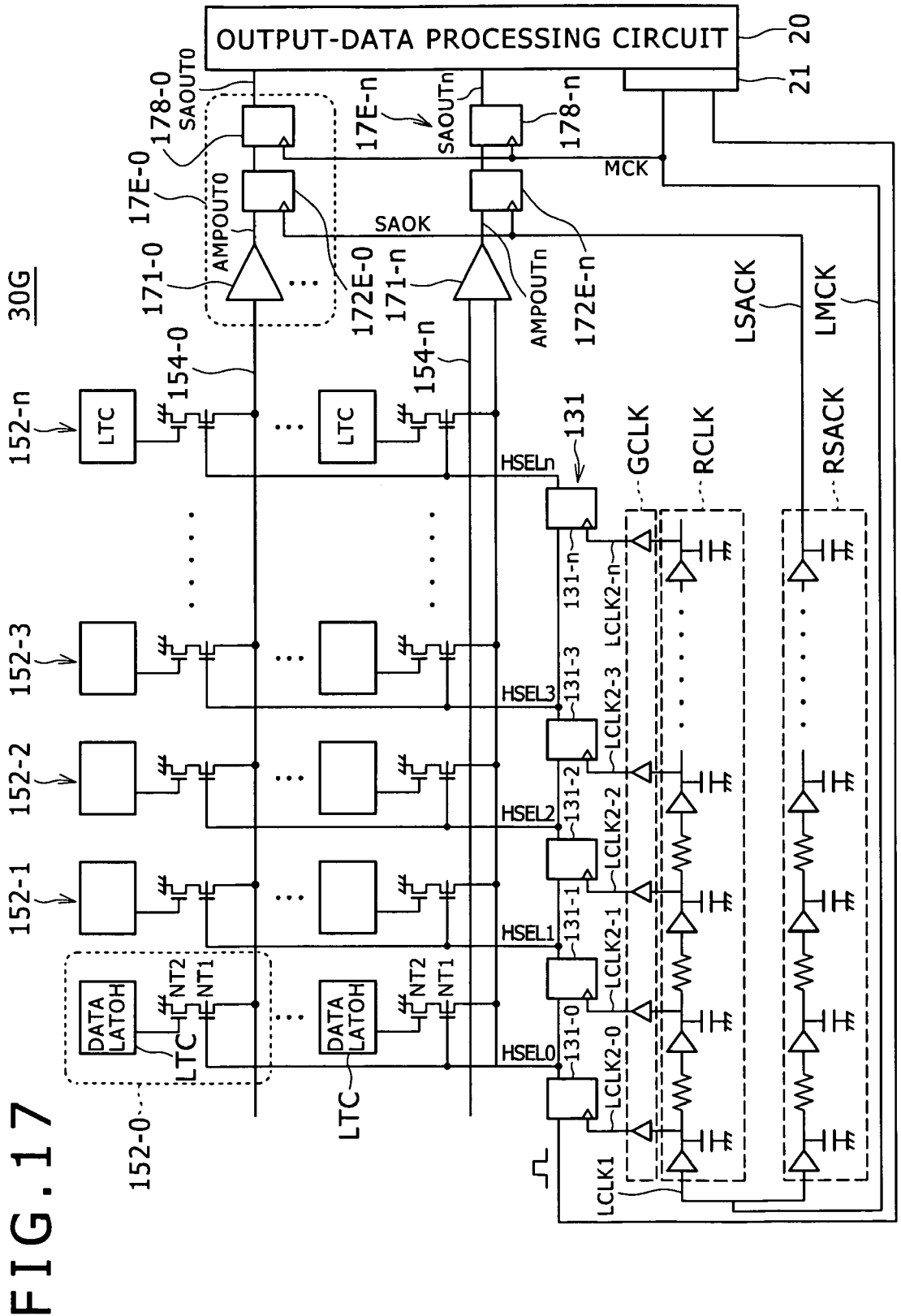
FIG. 17 is a diagram showing an eighth typical configuration of the data transfer system according to the embodiment.

Next, an eighth typical configuration of the data transfer system 30G according to the embodiment is explained by referring to FIG. 17. FIG. 17 is a diagram showing the eighth typical configuration of the data transfer system 30G according to the embodiment.

The eighth typical configuration of the data transfer system 30G shown in FIG. 17 is different from the sixth typical configuration of the data transfer system 30E shown in FIG. 15 in that, in the case of the eighth typical configuration of the data transfer system 30G, the data acquiring clock propagation line LSACK does not have a gate load at all.

In the case of the eighth typical configuration of the data transfer system 30G, the data read operation carried out synchronously with the driving-clock signal CLK to transfer imaging data from the counter latch 152 to the data transfer line 154 is delayed with a high degree of reliability from the data acquiring (or latching) operation carried out synchronously with the data acquiring clock signal SACK in the data outputting circuit 17 by a time delay quantity according to the gate load GCLK borne by the driving-clock propagation line LCLK1. Since the main cause of the time delay of the driving-clock signal CLK is the wire load RCLK whereas the main cause of the time delay of the data acquiring clock signal SACK is the wire load RSACK, however, if one of the time delays increases, the other time delay also rises as well. Thus, it is possible to sustain the relation between the phase of the driving-clock signal CLK and the phase of the data acquiring clock signal SACK even if the time delay state varies due to causes such as variations by wire fabrication process. As a result, the margin of the setup time can be assured with ease.

Figure 18:
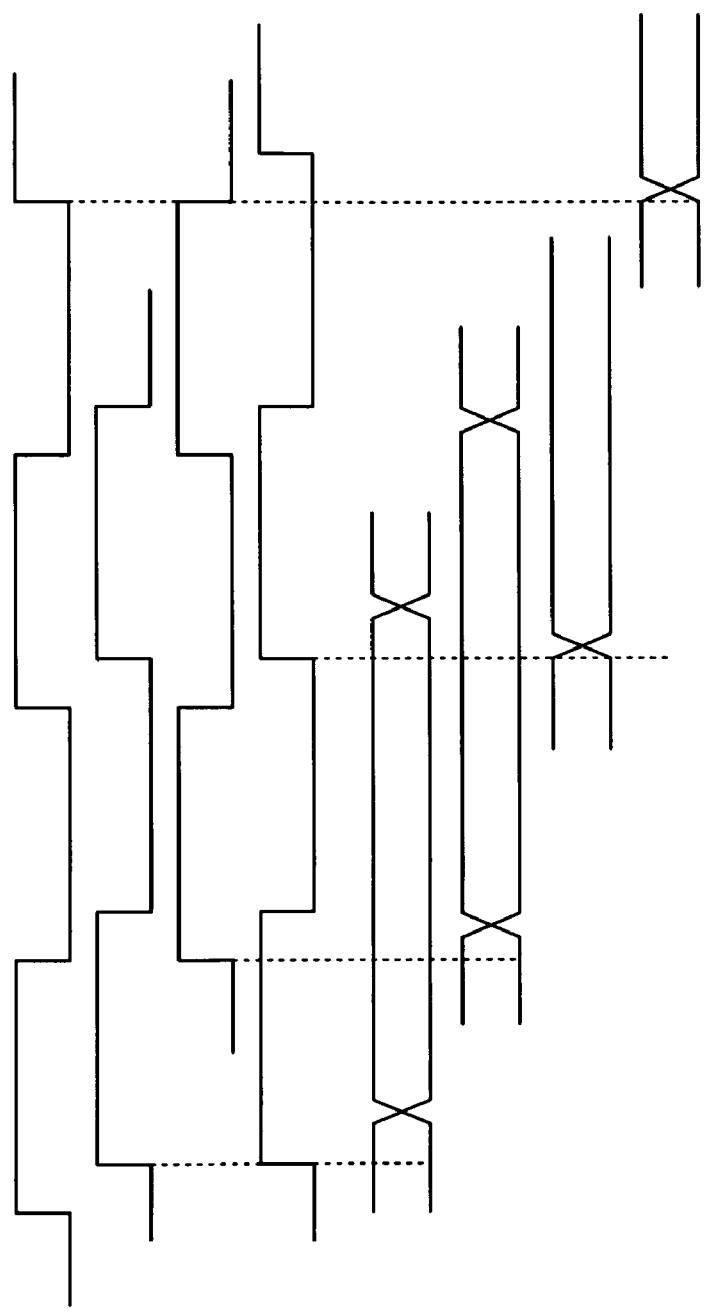
FIG. 18 shows timing charts of the data transfer system shown in FIG. 17.

Timing charts of the eighth typical configuration are shown in FIG. 18. FIG. 18A shows the timing chart of the waveform of the master-clock signal MCK generated by the master-clock generation section 21. FIG. 18B shows the timing chart of the waveform of a driving-clock signal CLK supplied to the clock supplying terminal of the select-signal generation section 131-0 farthest from the data outputting circuit 17E. FIG. 18C shows the timing chart of the waveform of a driving-clock signal CLK supplied to the clock supplying terminal of the select-signal generation section 131-n closest to the data outputting circuit 17E. FIG. 18D shows the timing chart of the waveform of the data acquiring clock signal SACK supplied to the clock supplying terminal of the data synchronization circuit 172E. FIG. 18E shows the time chart of imaging data transferred from the counter latch 152-0 to the data transfer line 154. FIG. 18F shows the time chart of imaging data transferred from the counter latch 152-n to the data transfer line 154. FIG. 18G shows the time chart of imaging data output by the data synchronization circuit 172E. FIG. 18H shows the time chart of imaging data output by the final data outputting circuit 178.

As shown in the timing charts of FIG. 18, in the eighth typical configuration of the data transfer system 30G, the timing of the data synchronization circuit 172E is controlled with a high degree of reliability so as to assure adequate timing margins.

<Ninth Typical Configuration of the Data Transfer System>

Figure 19:
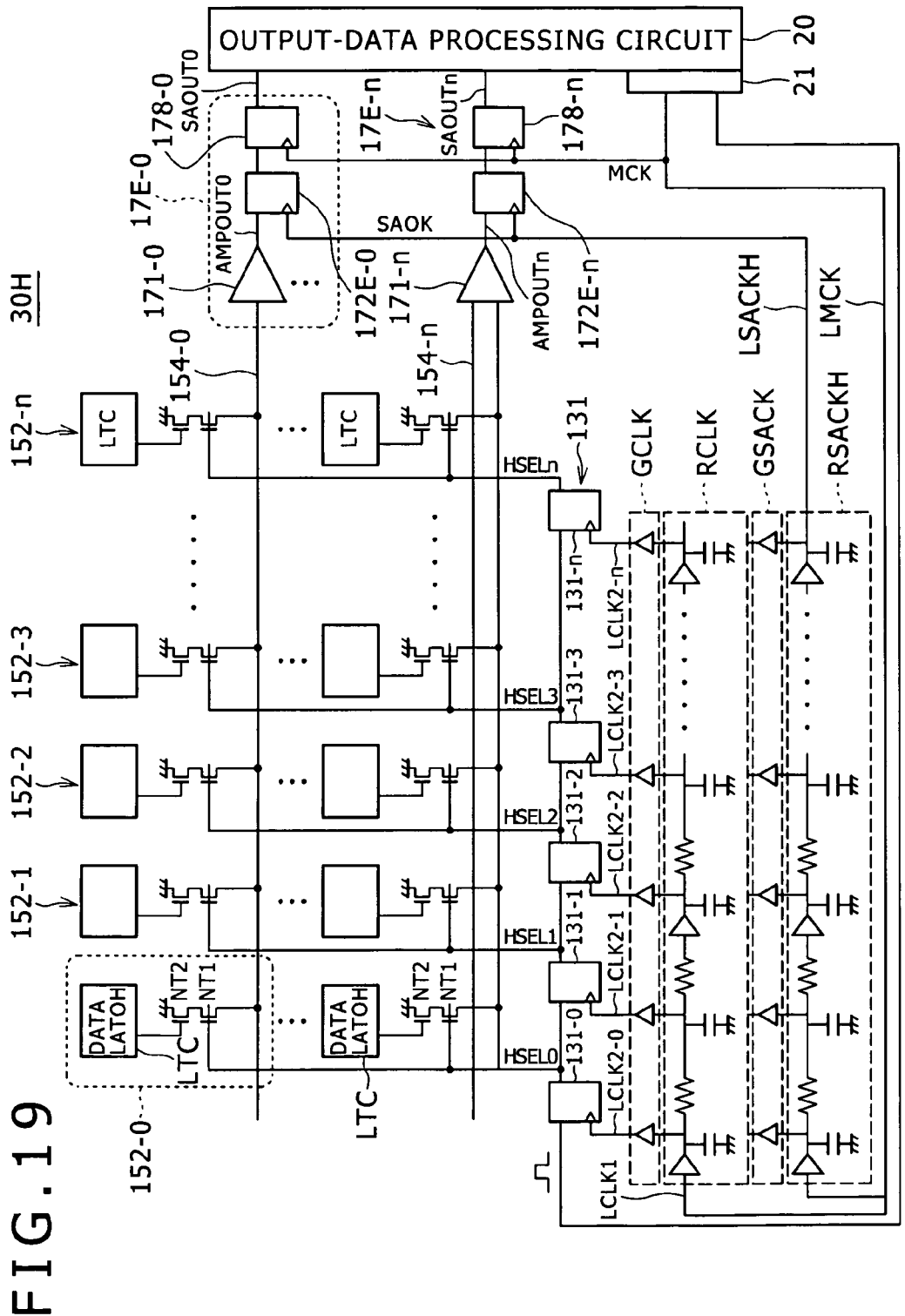
FIG. 19 is a diagram showing a ninth typical configuration of the data transfer system according to the embodiment.

Next, a ninth typical configuration of the data transfer system according to the embodiment is explained by referring to FIG. 19. FIG. 19 is a diagram showing the ninth typical configuration of the data transfer system 30H according to the embodiment.

In the ninth typical configuration of the data transfer system 30H, as shown in FIG. 19, the data acquiring clock propagation line LSACKH is short in comparison with the driving-clock propagation line LCLK1. Thus, the wire load RSACKH borne by the data acquiring clock propagation line LSACKH is small in comparison with the wire load RCLK borne by the driving-clock propagation line LCLK1. As a result, the time delay along the data acquiring clock propagation line LSACKH is shorter than the time delay along the driving-clock propagation line LCLK1. That is to say, a data scan operation carried out synchronously with the driving-clock signal CLK to read imaging data from the counter latch 152 to the data transfer line 154 is certainly delayed more than a data acquiring operation carried out in the data outputting circuit 17 synchronously with the data acquiring clock signal SACKH is. Thus, it is possible to sustain the relation between the phase of the driving-clock signal CLK and the phase of the data acquiring clock signal SACK. As a result, in the ninth typical configuration of the data transfer system 30H, it is possible to assure adequate timing margins.

It is to be noted that, in the ninth typical configuration of the data transfer system 30H shown in FIG. 19, much like the seventh typical configuration of the data transfer system 30F described earlier by referring to FIG. 17, it is possible to make the gate load GSACK borne by the data acquiring clock propagation line LSACK for propagating the data acquiring clock signal SACK smaller than the gate load GCLK borne by the driving-clock propagation line LCLK1 for propagating the driving-clock signal CLK so as to better assure timing margins.

In an alternative configuration provided as a modified version of the ninth typical configuration of the data transfer system 30H shown in FIG. 19, instead of shortening the data acquiring clock propagation line LSACKH as is the case with the ninth typical configuration of the data transfer system 30H, it is the driving-clock propagation line LCLK1 that is made long in comparison with the data acquiring clock propagation line LSACK so as to provide the driving-clock signal CLK propagating through the driving-clock propagation line LCLK1 with a time delay element relative to the data acquiring clock signal SACK. As another alternative configuration provided as a modified version of the ninth typical configuration of the data transfer system 30H, the driving-clock propagation line LCLK1 is connected to an extra gate load GCLKH so as to similarly provide the driving-clock signal CLK propagating through the driving-clock propagation line LCLK1 with a time delay element relative to the data acquiring clock signal SACK.

That is to say, in the ninth typical configuration, it is possible to change the wire load RCLK (including the gate load GCLK) borne by the driving-clock propagation line LCLK1, the wire load RSACK (including the gate load GSACK) borne by the data acquiring clock signal SACK or both the wire load RCLK and the wire load RSACK so that each of the wire load RCLK and the wire load RSACK can be set with a high degree of freedom. Thus, it is possible to establish a fixed relation between the phase of the driving-clock signal CLK and the phase of the data acquiring clock signal SACK. As a result, it is possible to well establish a reliably fixed relation between a data read operation carried out to assert imaging data from the counter latch 152 to the data transfer line 154 synchronously with the driving-clock signal CLK and a data acquiring (or latching) operation carried out in the data outputting circuit 17 synchronously with the data acquiring clock signal SACK.

As typical techniques for changing the wire and gate loads borne by a clock propagation line, the sixth to ninth typical configurations of the data transfer system described above adjusts the length (or the layout) of the clock propagation line. For example, the gate load GSACK borne by the data acquiring clock propagation line LSACK is changed. It is to be noted, however, that implementations of the present invention are by no means limited to these typical configurations. That is to say, it is possible to adopt any other techniques for changing the wire and gate loads borne by a clock propagation line.

As described above, the sixth to ninth typical configurations of the data transfer system adjusts the lengths (or layouts) of the driving-clock propagation line LCLK1 for propagating the driving-clock signal CLK and/or the data acquiring clock propagation line LSACK for propagating the data acquiring clock signal SACK in order to increase the wire loads of the lines LCLK1 and LSACK and/or give gate loads to the lines LCLK1 and LSACK in an attempt to provide delay elements to the clock signals CLK and SACK so as to adjust the relation between the phases of the clock signals CLK and SACK. As a result, it is possible to well set adequate timing margins.

Figure 20:
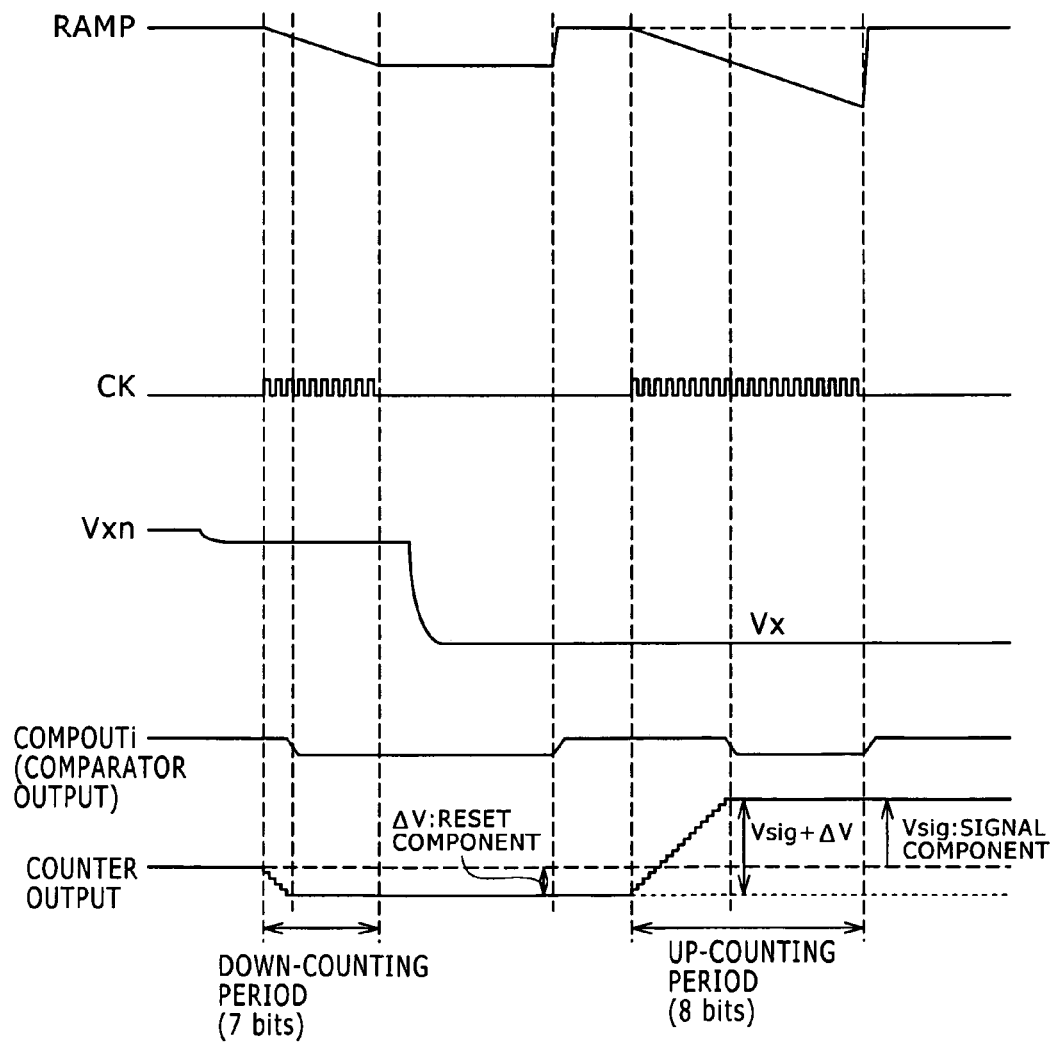
FIG. 20 shows explanatory timing charts to be referred to in description of operations carried out by the solid-state imaging device shown in FIG. 3.

By referring to timing charts shown in FIG. 20 and the block diagram of FIG. 3, the following description explains operations carried out by the solid-state imaging device (or the CMOS image sensor) according to the embodiment.

After a first operation to read out data from unit pixels 111 on a row Hx and transfer the data to the pixel column lines V0, V1 and so on becomes stable, the DAC 16 supplies a ramp-waveform reference voltage RAMP as a signal having a staircase waveform to the comparators 151. The comparators 151 each compare the ramp-waveform reference voltage RAMP with a voltage appearing on a pixel column line Vx connected to the comparator 151 as a voltage representing the data read out from the unit pixel 111 connected to the pixel column line Vx.

While the DAC 16 is supplying the ramp-waveform voltage RAMP as a reference signal having a staircase waveform to the comparator 151, the counter latch 152 carries out a reset counting operation for the first read operation to read out reset data from unit pixels 111 on the row Hx.

At an initial time, the counter latch 152 is set in a count-down state for carrying out a count-down operation in order to measure the magnitude of a reset voltage appearing in the unit pixel 111. As the ramp-waveform reference voltage RAMP becomes equal to the voltage appearing on the pixel column line Vx connected to the comparator 151 as a voltage representing the data read out from the unit pixel 111 connected to the pixel column line Vx, the output COMPOUTi of the comparator 151 is inverted and the counter latch 152 stops the count-down operation, latching the count value representing a reset component $\Delta V$ of the unit pixel 111.

When the counter latch 152 starts the count-down operation described above, the counter latch 152 contains an initial count value of typically 0. The initial count value is any value of the gradation of the AD conversion carried out by the ADC 15A. The count value latched at the end of the count-down operation thus represents a reset count period proportional to the aforementioned reset component $\Delta V$ of the unit pixel 111.

Then, after the column lines V0, V1 and so on each enter a stable state outputting a voltage according the quantity of incident light, the ramp-waveform reference voltage RAMP representing the counting period is supplied to the comparator 151 as a reference voltage REF having a staircase waveform to be compared with a voltage appearing on the corresponding one of the column lines V0, V1 and so on.

While the DAC 16 is supplying the ramp-waveform voltage RAMP as a reference signal having a staircase waveform to the comparator 151, the counter latch 152 this time carries out a counting-up operation. As the ramp-waveform reference voltage RAMP representing the counting period becomes equal to a voltage appearing on the corresponding column line Vx, the output COMPOUTi of the comparator 151 is inverted and the counter latch 152 stops the count-up operation, latching the count value representing the counting period, that is, the difference between the a reset component $\Delta V$ of the unit pixel 111 and imaging data generated in the unit pixel 111.

The counting result stored in the counter latch 152 is scanned by the column scan circuit 13 to be supplied as a digital signal to the sense amplifier circuit 171 employed in the data outputting circuit 17 through the data transfer line 154. In this way, digital imaging data is sequentially detected and output by the data outputting circuit 17.

As described above, the solid-state imaging device provided by the present invention employs:

a pixel array section (or an image-taking section) 11 including a plurality of unit pixels laid out to form a matrix and each used for carrying out an opto-electrical conversion process;

a plurality of data transfer lines 154-0 to 154-n each used for transferring digital data read out from the unit pixels;

a plurality of data outputting sections 17-0 to 17-n each used for detecting the digital data transferred by one of the data transfer lines 154-0 to 154-n and acquiring the detected digital data synchronously with a data acquiring clock signal SACK;

a plurality of counter latches 152-0 to 152-n laid out to form a parallel circuit, each used for holding digital data representing the level of an analog input appearing on a column line of the pixel array section 11 and each used for transferring the held data to a data transfer line included in the data transfer lines 154-0 to 154-n as a data transfer line associated with the held data in response to a select signal;

a data-acquiring-clock supplying section 22 for supplying the data acquiring clock signal SACK to each of the data outputting sections 17-0 to 17-n;

a master-clock supplying circuit 21 for generating at least a master clock signal MCK; and a column scan section 13 for generating the select signal synchronously with a driving-clock signal CLK based on the master clock signal MCK and outputting the select signal to each of the counter latches 152-0 to 152-n as a signal for selecting one of the counter latches 152-0 to 152-n, wherein, basically:

the data transfer lines 154-0 to 154-n are laid out in a direction in which the data counter latches 152-0 to 152-n are laid out to form the parallel circuit and connected to their respective data outputting sections 17-0 to 17-n also laid out in the same direction;

the column scan section 13 employs:

a shift register 131 having a plurality of select-signal generation sections (or latches) 131-0 to 131-n laid out in the direction in which the data counter latches 152-0 to 152-n are laid out to form the parallel circuit, each used for generating the select signal synchronously with the driving-clock signal CLK derived from the master clock signal MCK supplied by the master-clock supplying circuit 21 through a driving-clock propagation line determined in advance and each used for outputting the select signal to a counter latch included in the counter latches 152-0 to 152-n as a counter latch corresponding to the select signal; and the predetermined driving-clock propagation line for propagating the master clock signal MCK and supplying the master clock signal MCK to each of the select-signal generation sections 131-0 to 131-n as the driving-clock signal CLK; and the data-acquiring-clock supplying section 22 section adjusts the phase of the master clock signal MCK in order to generate the data acquiring clock signal SACK and supplies the data acquiring clock signal SACK to each of the data outputting sections 17-0 to 17-n as a signal used for acquiring imaging data from sense amplifier circuits 171-0 to 171-n employed in the data outputting sections 17-0 to 17-n respectively.

With the configuration described above, in an operation to transfer imaging data from the imaging section 11 to the data outputting circuit 17 in the horizontal direction, a position-dependent component caused by the transfer distance of the data can be eliminated. As described earlier, the position-dependent component is one of data skew components each obstructing efforts to increase a processing speed. Thus, the processing speed of the image sensor can be further raised and/or the size of the image sensor can be further increased.

In addition, since imaging data can be transferred through a line similar to a line for propagating a clock signal, it is possible to absorb effects of process variations from chip to chip and/or from wafer to wafer relatively with ease. Thus, the yield can be improved. In addition, since the data acquiring margin in the synchronization process carried out by the data synchronization circuit 172 can be increased, the design work can be made simpler. Accordingly, the design period and the number of man hours can be reduced.

The shift register 131 employed in the column scan circuit 13 operates synchronously with the driving-clock signal CLK based on the master clock signal MCK. Typically, the driving-clock signal CLK is distributed among the select-signal generation sections 131-0 to 131-n employed in the shift register 131 uniformly through a clock tree as shown in FIGS. 6 and 8. As an alternative, the driving-clock signal CLK is supplied to the select-signal generation sections 131 sequentially, starting with the select-signal generation section 131-0 farthest from the inputs of the sense amplifier circuits 171-0 to 171-n. It is to be noted that techniques adopted by the present invention as techniques for distributing the driving-clock signal CLK are by no means limited to these described here.

Figure 21:
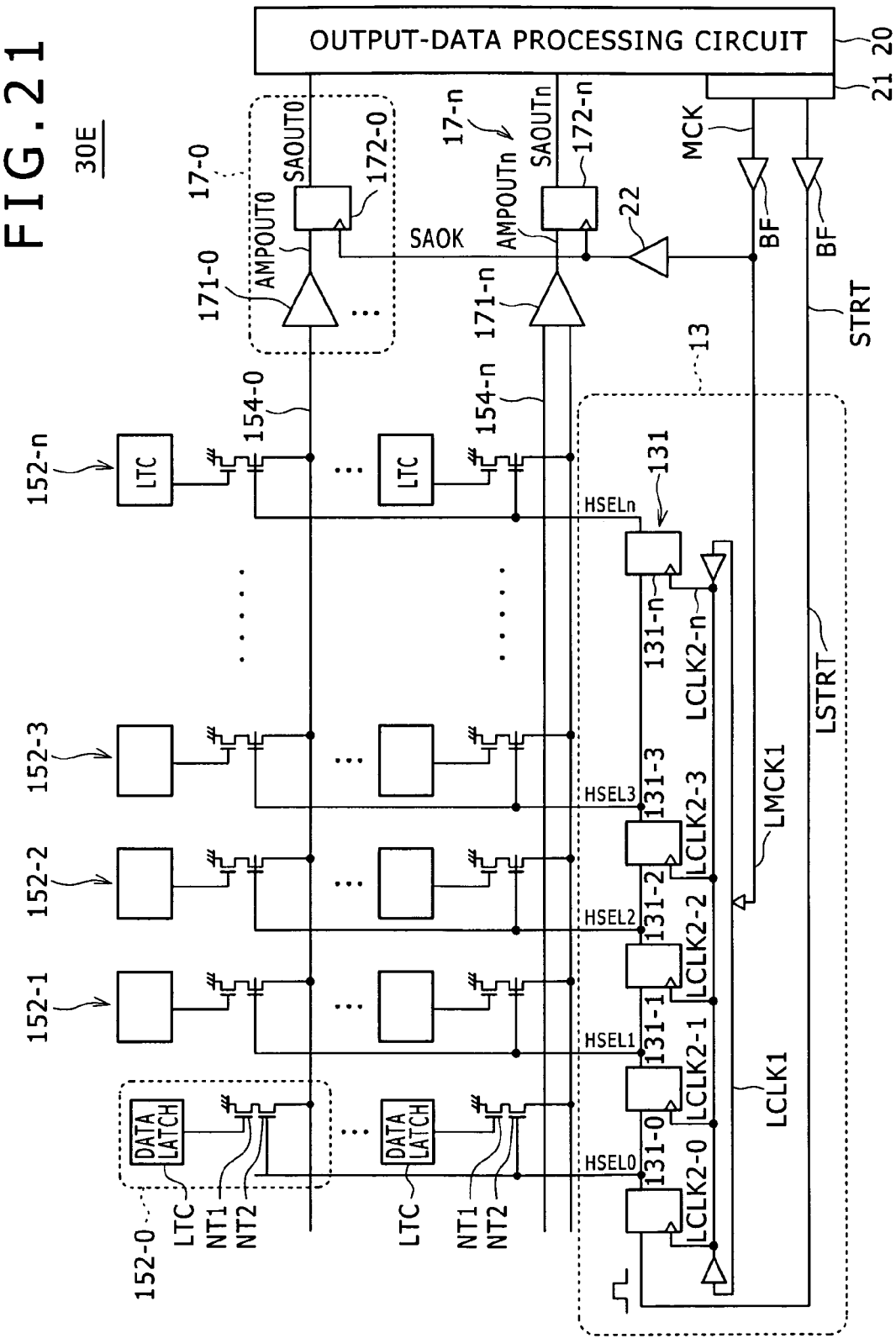
FIG. 21 is an explanatory diagram to be referred to in description of other distribution of clock signals in a column scan circuit according to the embodiment.

For example, the driving-clock signal CLK can also be distributed among the select-signal generation sections 131-0 to 131-n employed in the shift register 131 by splitting the propagation of the driving-clock signal CLK at a position in close proximity to the middle of the array of the select-signal generation sections 131-0 to 131-n and starting the distribution from the select-signal generation section 131-0 farthest from the inputs of the sense amplifier circuits 171-0 to 171-n and the select-signal generation section 131-n closest to the inputs of the sense amplifier circuits 171-0 to 171-n as shown in a configuration of FIG. 21.

The solid-state imaging device having the effects described above can be applied to a digital or video camera as an imaging device.

Figure 22:
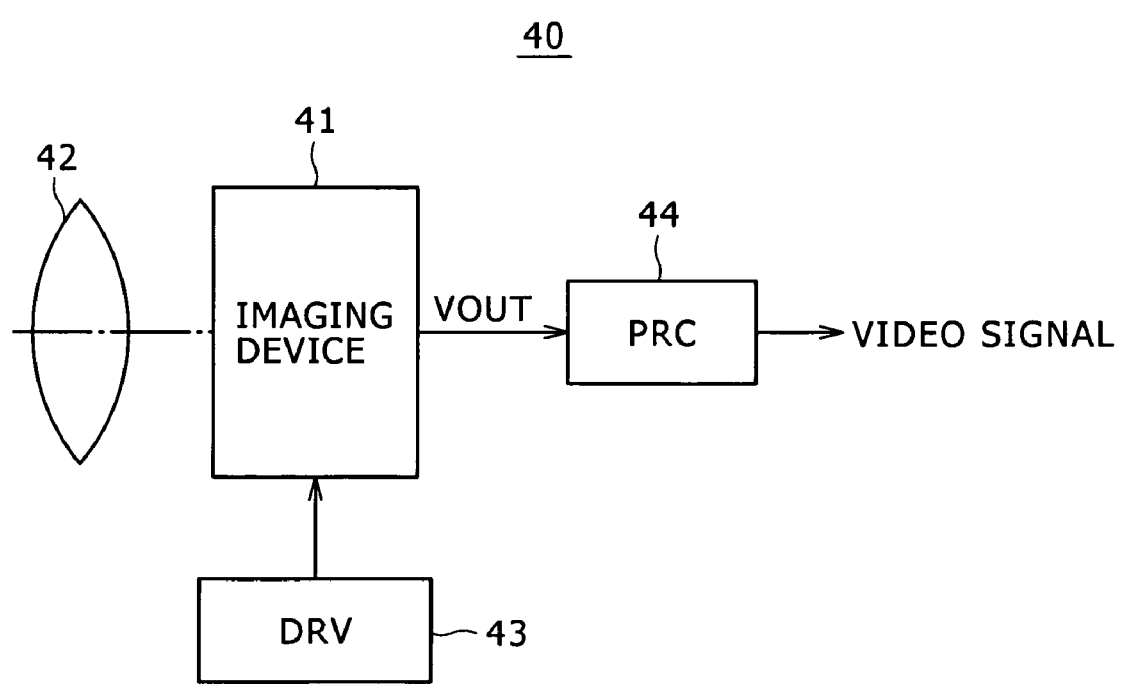
FIG. 22 is a diagram showing a typical configuration of a camera system to which the solid-state imaging device according to the embodiment of the present invention is applied.

FIG. 22 is a diagram showing a typical configuration of a camera system 40 to which the solid-state imaging device according to the embodiment of the present invention is applied.

As shown in FIG. 22, the camera system 40 employs an imaging device 41, a lens 42, a DRV (driving circuit) 43 and a PRC (signal processing circuit) 44. The imaging device 41 is the solid-state imaging device 10 according to the embodiment. The lens 42 is an optical system for leading incident light to the pixel area of the imaging device 41. Typically, the lens 42 is a lens for creating an image on the imaging surface of the imaging device 41 on the basis of the incident light. The driving circuit 43 is a circuit for driving the imaging device 41 whereas the signal processing circuit 44 is a circuit for processing a signal output by the imaging device 41.

The driving circuit 43 has a timing generator not shown in the figure. The timing generator is a circuit for generating a variety of timing signals including start and clock pulses for driving circuits inside the imaging device 41. That is to say, the driving circuit 43 drives the imaging device 41 by making use of the timing signals which are determined in advance.

In addition, the signal processing circuit 44 carries out signal processing such as a CDS (correlated double sample) process on the signal output by the imaging device 41. An image signal obtained as a result of the processing carried out by the signal processing circuit 44 is stored in a recording medium such as a memory. The image information stored in the recording medium can be printed on a printer or the like to produce a hard copy. In addition, the image information stored in the recording medium can be displayed on a monitor such as a liquid crystal display unit as a moving picture.

By applying the solid-state imaging device 10 to an imaging apparatus such as a digital still camera as the imaging device 41 as described above, a high-precision camera can be implemented.

In addition, it should be understood by those skilled in the art that a variety of modifications, combinations, sub-combinations and alterations may occur, depending on design requirements and other factors as far as they are within the scope of the appended claims or the equivalents thereof.

What is claimed is:

1. A data transfer circuit comprising:
   a plurality of data transfer lines each used for transferring data;
   a plurality of data outputting sections each used for detecting said data transferred by one of said data transfer lines and acquiring said detected data synchronously with a data acquiring clock signal;
   a plurality of data holding sections laid out to form a parallel circuit, each used for holding data according to an input level and each used for transferring said held data to a data transfer line included in said data transfer lines as a data transfer line associated with said held data in response to a select signal;
   a data-acquiring-clock supplying section configured to supply said data acquiring clock signal to each of said data outputting sections;
   a clock supplying section configured to generate at least a master clock signal; and
   a column scan section configured to generate said select signal synchronously with a driving-clock signal and outputting said select signal to each of said data holding sections, wherein:
   said data transfer lines are laid out in a direction, in which said data holding sections are laid out to form said parallel circuit, and connected to their respective data outputting sections also laid out in the same direction;
   said column scan section employs:
      a plurality of select-signal generation sections laid out in said direction, in which said data holding sections are laid out to form said parallel circuit, each used for generating said select signal synchronously with said received driving-clock signal and each used for outputting said select signal to a data holding section included in said data holding sections as a data holding section corresponding to said select signal; and
      a driving-clock propagation line for propagating said master clock signal and supplying said master clock signal to each of said select-signal generation sections as said driving-clock signal; and
   said data-acquiring-clock supplying section supplies said master clock signal or a clock signal taking said master clock signal as a reference signal to each of said data outputting sections as said data acquiring clock signal.

2. The data transfer circuit according to claim 1 wherein said driving-clock propagation line included in said column scan section:
   propagates said master clock signal to an end side farthest from the inputs of said data outputting sections; and
   selectively supplies said master clock signal as said driving-clock signal to said select-signal generation sections selected sequentially in an order starting with said select-signal generation section located at said end side farthest from said inputs of said data outputting sections and ending with said select-signal generation section located at an end side closest to said inputs of said data outputting sections.

3. The data transfer circuit according to claim 2 wherein:
said driving-clock propagation line included in said column scan section as a line for selectively supplying said driving-clock signal to said select-signal generation sections selected sequentially is stretched in the same direction as said data transfer lines; and
a sum of a time delay experienced by said driving-clock signal to arrive at any particular one of said select-signal generation sections through said driving-clock propagation line and a time delay experienced by data in propagating through one of said data transfer lines from said data holding section located on the same pixel column as said particular select-signal generation section to the inputs of said data outputting sections is fixed without regard to the location of said pixel column.

4. The data transfer circuit according to claim 2 wherein:
said driving-clock propagation line included in said column scan section as a line for selectively supplying said driving-clock signal to said select-signal generation sections selected sequentially is stretched in the same direction as said data transfer lines; and
said data-acquiring-clock supplying section supplies said driving-clock signal propagating through said driving-clock propagation line to each of said data outputting sections as said data acquiring clock signal.

5. The data transfer circuit according to claim 2 wherein:
said column scan section includes a master-clock propagation line for propagating said master clock;
said master-clock propagation line is stretched in the same direction as said driving-clock propagation line;
said column scan section includes at least a shield line provided between said driving-clock propagation line and said master-clock propagation line; and
said shield line is set at a fixed electric potential.

6. The data transfer circuit according to claim 1, said data transfer circuit further comprising:
a pseudo-data transfer line stretched in the same direction as said data transfer lines; and
a plurality of pseudo-data storage sections each used for storing pseudo data to be output to said pseudo-data transfer line in response to said select signal generated synchronously with said driving-clock signal based on said master clock signal,
wherein said data-acquiring-clock supplying section supplies said pseudo data asserted on said pseudo-data transfer line to each of said data outputting sections as said data acquiring clock signal.

7. The data transfer circuit according to claim 6 wherein said pseudo data stored in said pseudo-data storage sections is a repetitive pattern of 1 and 0 and has a repetition frequency equal to the frequency of data transferred through said data transfer lines.

8. The data transfer circuit according to claim 7 wherein said data outputting sections each include a data acquiring section configured to complementarily acquire said data, which has been complementarily transferred to said data outputting sections through said data transfer lines, synchronously with a level-transition rising edge of said pseudo data supplied to said data outputting sections as said data acquiring clock signal, a level-transition falling edge of said pseudo data or both said level-transition rising and falling transition edges.

9. The data transfer circuit according to claim 8 wherein said data outputting sections each include a data synchronization section configured to reacquire data, which has been acquired by said data acquiring section, synchronously with a clock signal taking said master clock signal as a reference signal.

10. The data transfer circuit according to claim 1 wherein said data-acquiring-clock supplying section has a function for adjusting the phase of a clock signal supplied to said data-acquiring-clock supplying section.

11. The data transfer circuit according to claim 2 wherein said data-acquiring-clock supplying section:
includes a data-acquiring-clock propagation line having a wire load approximately equal to a wire load borne by said driving-clock propagation line; and
supplies said master clock signal or a clock signal taking said master clock signal as a reference signal to said data outputting sections through said data-acquiring-clock propagation line as said data acquiring clock signal.

12. The data transfer circuit according to claim 11 wherein at least one of said wire load borne by said data-acquiring-clock propagation line and said wire load borne by said driving-clock propagation line can be changed.

13. A solid-state imaging device comprising:
an imaging section including a plurality of pixels laid out to form a matrix and each used for carrying out an opto-electrical conversion process;
a plurality of data transfer lines each used for transferring data;
a plurality of data outputting sections each used for detecting said data transferred by one of said data transfer lines and acquiring said detected data synchronously with a data acquiring clock signal;
a plurality of data holding sections laid out to form a parallel circuit, each used for holding data according to an input level and each used for transferring said held data to a data transfer line included in said data transfer lines as a data transfer line associated with said held data in response to a select signal;
a data-acquiring-clock supplying section configured to supply said data acquiring clock signal to each of said data outputting sections;
a clock supplying section configured to generate at least a master clock signal; and
a column scan section configured to generate said select signal synchronously with a driving-clock signal and outputting said select signal to each of said data holding sections, wherein:
said data transfer lines are laid out in a direction in which said data holding sections are laid out to form said parallel circuit and connected to their respective data outputting sections also laid out in the same direction;
said column scan section employs:
a plurality of select-signal generation sections laid out in said direction in which said data holding sections are laid out to form said parallel circuit, each used for generating said select signal synchronously with said received driving-clock signal and each used for outputting said select signal to a data holding section included in said data holding sections as a data holding section corresponding to said select signal; and
a driving-clock propagation line for propagating said master clock signal and supplying said master clock signal to each of said select-signal generation sections as said driving-clock signal; and
said data-acquiring-clock supplying section supplies said master clock signal or a clock signal taking said master clock signal as a reference signal to each of said data outputting sections as said data acquiring clock signal.

14. The solid-state imaging device according to claim 13 wherein:
said driving-clock propagation line included in said column scan section propagates said master clock signal to an end side farthest from the inputs of said data outputting sections;
said driving-clock propagation line selectively supplies said master clock signal as said driving-clock signal to said select-signal generation sections selected sequentially in an order starting with said select-signal generation section located at said end side farthest from said inputs of said data outputting sections and ending with said select-signal generation section located at an end side closest to said inputs of said data outputting sections;
said driving-clock propagation line is stretched in the same direction as said data transfer lines; and
said data-acquiring-clock supplying section supplies said driving-clock signal propagating through said driving-clock propagation line to each of said data outputting sections as said data acquiring clock signal.

15. The solid-state imaging device according to claim 13, said solid-state imaging device further comprising:
a pseudo-data transfer line stretched in the same direction as said data transfer lines; and
a plurality of pseudo-data storage sections each used for storing pseudo data to be output to said pseudo-data transfer line in response to said select signal generated synchronously with said driving-clock signal based on said master clock signal, wherein
said data-acquiring-clock supplying section supplies said pseudo data asserted on said pseudo-data transfer line to each of said data outputting sections as said data acquiring clock signal.

16. The solid-state imaging device according to claim 13 wherein said data-acquiring-clock supplying section:
includes a data-acquiring-clock propagation line having a wire load approximately equal to a wire load borne by said driving-clock propagation line; and
supplies said master clock signal or a clock signal taking said master clock signal as a reference signal to said data outputting sections through said data-acquiring-clock propagation line as said data acquiring clock signal.

17. The solid-state imaging device according to claim 16 wherein at least one of said wire load borne by said data-acquiring-clock propagation line and said wire load borne by said driving-clock propagation line can be changed.

18. A camera system having a solid-state imaging device, an optical system for creating an image on said solid-state imaging device and a signal processing circuit for processing an image signal output by said solid-state imaging device wherein:
said solid-state imaging device comprises:
an imaging section including a plurality of pixels laid out to form a matrix and each used for carrying out an opto-electrical conversion process;
a plurality of data transfer lines each used for transferring data;
a plurality of data outputting sections each used for detecting said data transferred by one of said data transfer lines and acquiring said detected data synchronously with a data acquiring clock signal;
a plurality of data holding sections laid out to form a parallel circuit, each used for holding data according to an input level and each used for transferring said held data to a data transfer line included in said data transfer lines as a data transfer line associated with said held data in response to a select signal;
a data-acquiring-clock supplying section configured to supply said data acquiring clock signal to each of said data outputting sections;
a clock supplying section configured to generate at least a master clock signal; and
a column scan section configured to generate said select signal synchronously with a driving-clock signal and outputting said select signal to each of said data holding sections,
said data transfer lines are laid out in a direction in which said data holding sections are laid out to form said parallel circuit and connected to their respective data outputting sections also laid out in the same direction;
said column scan section employs:
a plurality of select-signal generation sections laid out in said direction in which said data holding sections are laid out to form said parallel circuit, each used for generating said select signal synchronously with said received driving-clock signal and each used for outputting said select signal to a data holding section included in said data holding sections as a data holding section corresponding to said select signal; and
a driving-clock propagation line for propagating said master clock signal and supplying said master clock signal to each of said select-signal generation sections as said driving-clock signal; and
said data-acquiring-clock supplying section supplies said master clock signal or a clock signal taking said master clock signal as a reference signal to each of said data outputting sections as said data acquiring clock signal.

19. The camera system according to claim 18 wherein:
said driving-clock propagation line included in said column scan section propagates said master clock signal to an end side farthest from the inputs of said data outputting sections;
said driving-clock propagation line selectively supplies said master clock signal as said driving-clock signal to said select-signal generation sections selected sequentially in an order starting with said select-signal generation section located at said end side farthest from said inputs of said data outputting sections and ending with said select-signal generation section located at an end side closest to said inputs of said data outputting sections;
said driving-clock propagation line is stretched in the same direction as said data transfer lines; and
said data-acquiring-clock supplying section supplies said driving-clock signal propagating through said driving-clock propagation line to each of said data outputting sections as said data acquiring clock signal.

20. The camera system according to claim 18, said camera system further comprising:
a pseudo-data transfer line stretched in the same direction as said data transfer lines; and
a plurality of pseudo-data storage sections each used for storing pseudo data to be output to said pseudo-data transfer line in response to said select signal generated synchronously with said driving-clock signal based on said master clock signal,
wherein said data-acquiring-clock supplying section supplies said pseudo data asserted on said pseudo-data transfer line to each of said data outputting sections as said data acquiring clock signal.

21. The camera system according to claim 18 wherein said data-acquiring-clock supplying section:

- includes a data-acquiring-clock propagation line having a wire load approximately equal to a wire load borne by said driving-clock propagation line; and
- supplies said master clock signal or a clock signal taking said master clock signal as a reference signal to said data outputting sections through said data-acquiring-clock propagation line as said data acquiring clock signal.

22. The camera system according to claim 21 wherein at least one of said wire load borne by said data-acquiring-clock propagation line and said wire load borne by said driving-clock propagation line can be changed.

* * * * *